United States Patent [19]
Yamashita et al.

[11] Patent Number: 5,719,873
[45] Date of Patent: Feb. 17, 1998

[54] FRAME-SYNCHRONOUS REPRODUCING CIRCUIT

[75] Inventors: Syugo Yamashita; Yoshikazu Tomida, both of Osaka; Masayuki Takada, Tokyo; Toru Kuroda, Tokyo; Tadashi Isobe, Tokyo; Osamu Yamada, Tokyo, all of Japan

[73] Assignees: Sanyo Electric Co., Ltd., Osaka; Nippon Hoso Kyokai, Tokyo, both of Japan

[21] Appl. No.: 499,256

[22] Filed: Jul. 7, 1995

[30] Foreign Application Priority Data

Jul. 7, 1994 [JP] Japan ................... 6-155624

[51] Int. Cl.⁶ ............................................. H04L 7/00
[52] U.S. Cl. .................... 370/513; 370/514; 375/366; 375/368
[58] Field of Search ......................... 370/506, 509, 370/512, 513, 514, 522, 503; 375/368, 366, 354; 371/37.1, 42

[56] References Cited

U.S. PATENT DOCUMENTS

| | | | |
|---|---|---|---|
| 4,694,473 | 9/1987 | Etoh | 370/513 |
| 4,763,339 | 8/1988 | Sutphin et al. | 370/513 |
| 4,823,362 | 4/1989 | Etoh | 375/368 |
| 5,140,618 | 8/1992 | Kinoshita et al. | 370/513 |
| 5,228,065 | 7/1993 | Herzberger | 370/511 |
| 5,297,185 | 3/1994 | Best et al. | 370/514 |
| 5,299,236 | 3/1994 | Pandula | 370/516 |
| 5,339,337 | 8/1994 | Levine | 375/114 |
| 5,428,647 | 6/1995 | Rasky et al. | 375/366 |
| 5,509,036 | 4/1996 | Nakata | 370/514 |

*Primary Examiner*—Benedict V. Safourek
*Assistant Examiner*—Seema S. Rao
*Attorney, Agent, or Firm*—Armstrong, Westerman, Hattori, McLeland & Naughton

[57] ABSTRACT

A frame-synchronous reproducing circuit (10) includes a BIC status register (20) of six stages, and a BIC status signal (c) from each stage of the register is applied to a BIC pattern determination circuit (24) in which the BIC status signal (c) and a BIC changing pattern being stored in advance are compared with each other. If the both are coincident with each other, the BIC pattern determination circuit (24) applies a high-level signal to a JK flip-flop (26) via an OR circuit (48), whereby a high-level signal representing that frame synchronization has been settled is outputted from the JK flip-flop (26).

15 Claims, 20 Drawing Sheets

FRAME-SYNCHRONOUS REPRODUCING CIRCUIT

BACKGROUND OF THE INVENTION

1. Field of the Invention

The present invention relates to a frame-synchronous reproducing circuit. More specifically, the present invention relates to a frame-synchronous reproducing circuit which is utilized in a mobile FM multiplex broadcasting receiver or FM subcarrier data receiver, and receives data in which a frame is formed by interleaving a plurality of blocks each having a block identification code (BIC) for establishment of frame synchronization and block synchronization, which being added to a head of each code word, and kinds of BICs are fixedly assigned according to positions within the frame so that changing patterns of the BICs are fixed at the predetermined number of kinds.

2. Description of the Related Art

In an FM multiplex broadcasting, as shown in FIG. 20, data of a frame is formed by a plurality of blocks, and four (4) kinds of BICs, each of which functions as a synchronization signal, are added to heads of respective packets each including code words to form the respective blocks. Therefore, in the mobile FM subcarrier data receiver, the block synchronization is established by detecting the BICs, and by detecting changing points of the BICs, the frame synchronization is established.

More specifically, there were four (4) kinds of BICs, i.e., BIC1, BIC2, BIC3 and BIC4. Then, within a single frame, there are four (4) changing points by which positions within the frame can be decided (hereinafter, simply called as "frame changing point") of (BIC4-BIC1), (BIC1-BIC3), (BIC4-BIC2) and (BIC2-BIC3).

With reference to FIG. 21, a conventional frame-synchronous reproducing circuit 1 of the mobile FM subcarrier data receiver, the frame changing point is detected by a BIC pattern determination circuit 2, and the number of times that the frame changing point is continuously detected is counted by a counter 3 for frame synchronization backward protection. If it is detected by the counter 3 that the number of the frame changing points continuously detected becomes equal to the number of times for the frame synchronization backward protection, a frame synchronization signal is outputted from a JK flip-flop 4, and a count value which is corresponding to a frame changing point being detected at last is loaded to a frame counter 5, thereby to establish the frame synchronization.

On the other hand, after the establishment of the frame synchronization, inspection of whether or not there is packet deviation due to erroneous establishment of the frame synchronization and deterioration of receiving state is performed by a counter 6 for frame synchronization forward protection. That is, if the number of times that no frame changing point can be continuously detected becomes equal to the number of times for frame synchronization forward protection, the counter 6 frame synchronization in a non-established state.

In addition, in the mobile FM multiplex broadcasting, because data structure, a product code encoded by a (272, 190) shortened different cyclic code is adopted, if the frame synchronization is not established, because it is impossible to perform column direction error correction, it is impossible to sufficiently display an error-correctability. Furthermore, data packets and parity packets are interleaved, and therefore, if the frame synchronization is not established, it is difficult to distinguish the data packets or the parity packets from each other.

However, in the prior art, it takes a long time to establish the frame synchronization, and therefore, it is desired to provide a way wherein the frame synchronization can be quickly established.

Furthermore, in the prior art, if each of the four (4) kinds of BIC changing patterns of (BIC4-BIC1), (BIC1-BIC3), (BIC4-BIC2) and (BIC2-BIC3) is not continuously detected by the number of times equal to the number of times for frame synchronization backward protection at a predetermined position, no frame synchronization can be established. However, in a case where the settlement of the frame synchronization is deviated from a true frame changing point by one packet, detected BIC changing patterns become (BIC4-) <u>BIC1</u>-BIC1), (BIC1-) <u>BIC3</u>-BIC3), (BIC4-) <u>BIC2</u>-BIC2), and (BIC2-) <u>BIC3</u>-BIC3), and therefore, if the bit patterns of the BICs just after the frame changing points to which underlines are added are continuously changed so as to approach the bit patterns of the BICs being bracketed just before the frame changing points, there is a possibility that the frame synchronization is erroneously established. Especially, in a case where the number of times for backward protection is set small such that the frame synchronization can be quickly established, such a phenomenon easily occurs.

SUMMARY OF THE INVENTION

Therefore, a principal object of the present invention is to provide a frame-synchronous reproducing circuit capable of quickly establishing frame synchronization with high accuracy.

In a first aspect, by setting a position at which the frame synchronization is established after a few or several packets from the frame changing point, it is possible to detect whether or not block synchronization is established for a few or several blocks before and after the frame changing point, by loading a value corresponding to a position at which the frame synchronization is probably established into the frame counter, the frame synchronization can be established.

For example, with respect to the frame changing point of (BIC4-BIC1) or (BIC4-BIC2), the position at which the frame synchronization is established, i.e., the number of the blocks is set in a manner such that the number of the blocks before the frame changing point becomes greater than the number of the blocks after the frame changing point, and with respect to the frame changing point of (BIC1-BIC3) or (BIC2-BIC3), the position at which the frame synchronization is established is set in a manner such that the number of the blocks before the frame changing point becomes less than the number of the blocks after the frame changing point.

Then, according to whether or not the BIC changing pattern including the frame changing point is a predetermined pattern, the frame changing point is detected, and at a time in which the frame changing point is detected, a value corresponding to the frame changing point, i.e., a value after a few or several packets from the frame changing point is loaded to the frame counter.

In a second aspect, monitor means increments the counter at a time that a first BIC changing pattern is detected at a timing in which the first BIC changing pattern is to be originally detected, and the monitor means decrements the counter at a time such that no first BIC changing pattern is detected at a timing in which the first BIC changing pattern is to be originally detected, or a time in which the first BIC changing pattern is detected at timings other than the timing that the first BIC changing pattern is to be originally detected. That is, "1" is fed to a shift register, for example, in a forward direction by the monitor means at a time that the first BIC changing pattern is detected, and "0" is fed to the shift register in a backward direction by the monitor means at a time in which no first BIC changing pattern is detected.

When the BIC pattern determination means detects a second BIC changing pattern including a frame changing point of (BIC4-BIC1 or BIC2) at a time in which a first BIC changing pattern of (BIC4-BIC3) is to be detected, if the monitor means which monitors the first BIC changing pattern of (BIC4-BIC3) before the frame changing point outputs "1" from a predetermined stage of the shift register, that frame changing point is regarded as a true frame changing point.

Furthermore, if the monitor means which monitors the first BIG changing pattern of (BIG1 or BIG2-BIC1 or BIG2) outputs "1" from a predetermined stage of the shift register when the BIC pattern determination means detects the second BIG changing pattern including a frame changing point of (BIG1 or BIC2-BIG3), that frame changing point is regarded as a true frame changing point.

In a third aspect, an appearance of a sub-changing point is monitored by the monitor means, and by detecting the frame changing point by a BIC changing point detection means, as similar to the second aspect, the frame changing point can be detected.

In accordance with the present invention, since the frame changing point can be detected quickly and accurately, it is possible to quickly and accurately establish the frame synchronization. Therefore, it is possible to quickly distinguish the data packet and the parity packet from each other, and therefore, a time until the received data is provided to the user can be shortened.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The erroneous establishment of the frame synchronization in the related art is caused by a fact that the frame changing point is detected by only the BICs added to before and after two packets. Therefore, if the frame changing point is determined by detecting whether or not the BIC changing pattern of a few or several blocks before and after the frame changing point are coincident with a true change pattern, a possibility that the erroneous establishment of the frame synchronization is clearly decreased.

It is needless to say that the accuracy can be increased by detecting the frame changing point with utilizing the BICs of larger number of packets; however, if to do so, the hardware becomes a large scale. Therefore, it is desirable that the frame changing point can be accurately detected with a smaller number of blocks.

Figure 1:
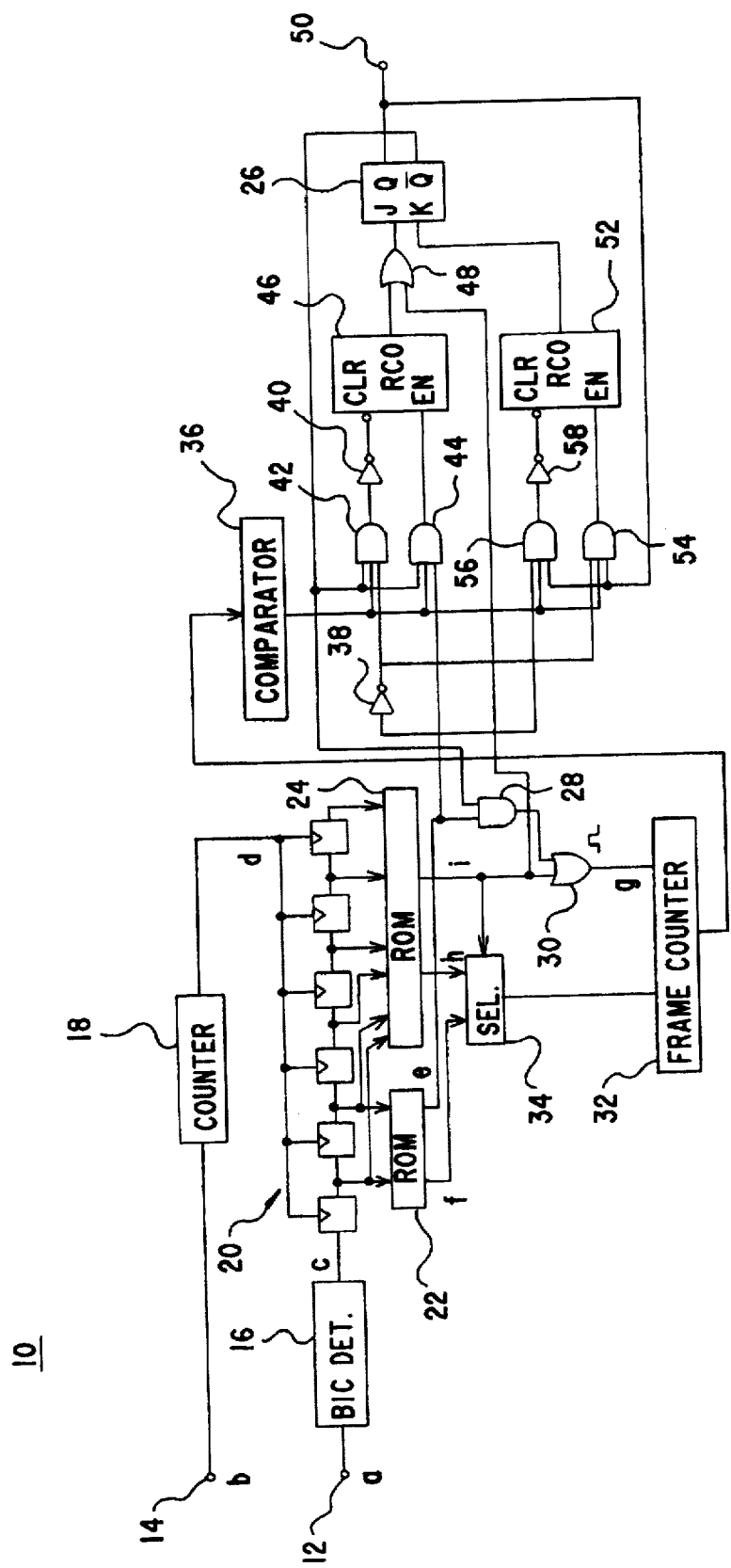
FIG. 1 is a circuit diagram showing one embodiment according to the present invention.

Such a requirement can be implemented by effectively utilizing a pattern of (BIC3-BIC3-BIC4) out of the BIC changing patterns of the mobile FM multiplex broadcasting because as different from a pattern of (BIC1-BIC1) or (BIC2-BIC2), the pattern of (BIC3-BIC3 BIC4) is a pattern by which a positional deviation within the frame can be easily detected. In the pattern of (BIC1-BIC1), if the position is deviated by one packet from its original position, the changing pattern of (BIC1-BIC1) is also detected, and therefore, the positional deviation can not be detected; however, in the pattern of (BIC3-BIC3-BIC4), if the positional deviation occurs, the pattern becomes (BIC3-BIC4-BIC3), and therefore, the positional deviation can be detected. Accordingly, in a BIC comparison range utilized for detecting the frame changing point, if the number of the patterns of (BIC3-BIC3-BIC4) is made larger than the number of the patterns in which BIC1 or BIC2 is succeeded, the scale of the hardware can be reduced. One embodiment in which such a concept is specifically implemented is shown in FIG. 1. In addition, in the following, a description will be made on the assumption that the block synchronization has been established.

A frame-synchronous reproducing circuit 10 includes terminals 12 and 14, and reception data (a) is applied to the terminal 12, and a clock signal (b) of the FM multiplex broadcasting which is in synchronous with the reception data (a) is inputted to the terminal 14. A data transfer rate of the reception data (a) is 16 kbps, for example.

A BIC detection circuit 16 determines whether or not the reception data (a) is within the allowable number of bits for a BIC error. If the reception data (a) is a pattern within the allowable number of bits for the BIC error, the BIC detection circuit 16 determines the reception data (a) is which one of the BICs. More specifically, the BIC detection circuit 16 determines that the reception data (a) represents which one of the states of the BIC1, BIC2, BIC3, BIC4 or no BIC, and the determination is outputted to a BIC status register 20 which includes a shift register of six (6) stages, for example, as a BIC status signal (c) of three (3) bits, for example. The BIC status signal (c) is constituted by three (3) bits of (b2, b1, b0) as shown in the following table 1.

TABLE 1

| Kinds | b2 | b1 | b0 |
|---|---|---|---|
| no BIC | 0 | 0 | 0 |
| BIC1 | 0 | 0 | 1 |
| BIC2 | 0 | 1 | 1 |
| BIC3 | 0 | 1 | 1 |
| BIC4 | 1 | 0 | 0 |

As shown in the table 1, the BIC status signal (c) becomes "000" at a time that no BIC is detected, "001" at a time that the BIC1 is detected, "010" at a time that the BIC2 is detected, "011" at a time that the BIC3 is detected, or "100" at a time that the BIC4 is detected.

A counter 18 is a counter of modulo 288, which is incremented in synchronization with the clock signal (b). Therefore, the counter 18 counts the number of bits (0–287) forming a single block with utilizing the clock signal (b) inputted from the terminal 14, and outputs a ripple carry signal at every timing that the BIC detection position is determined as a shift/latch signal (d). In addition, since the block synchronization has been established, a reset signal for the counter 18 is omitted.

At the BIC detection timing shown by the shift/latch signal (d) from the counter 18, respective stages of the BIC status register 20 are shifted right, and the BIC state signal (c) from the BIG detection circuit 16 is latched in a first stage of the BIG status register 20. Accordingly, signals outputted from the respective stages of the BIG status register 20 show which kinds of the BICs are detected for a few or several blocks (6 blocks in this embodiment shown).

BIC pattern determination circuits 22 and 24 stores BIC changing patterns and output addresses corresponding thereto shown in the following tables 2(A) and 2(B). The BIC changing patterns shown in the tables 2(A) and 2(B) are regarded as true or normal changing patterns. In the table 2(A), the BIC changing patterns for two (2) blocks representative of the frame changing point are shown, and in the table 2(B), the BIC changing patterns for n blocks before and after the frame changing point are shown. In this embodiment shown, n is six (6).

TABLE 2 (A)

| | t | Timing t-288 | Output Address |
|---|---|---|---|
| Continuous | 3 | 1 | 14 |
| BIC | 2 | 4 | 137 |
| Changing | 3 | 2 | 150 |
| Patterns | 1 | 4 | 1 |

TABLE 2 (B)

| | Timing | | | | | Output |
|---|---|---|---|---|---|---|
| | t | t-288 | t-576 | t-864 | t-1152 | t-1440 | Address |
| Continuous | 3 | 4 | 3 | 3 | 1 | 1 | 17 |
| BIC | 2 | 2 | 4 | 3 | 3 | 4 | 138 |
| Changing | 3 | 4 | 3 | 3 | 2 | 2 | 153 |
| Patterns | 1 | 1 | 4 | 3 | 3 | 4 | 2 |

The BIC pattern determination circuits 22 and 24 are constructed by ROMs, respectively. Outputs from the first and second stages of the BIC status register 20 are compared with the BIC changing patterns shown in table 2(A) by the BIC pattern determination circuit 22. If the BIC pattern determination circuit 22 detects the BIC changing patterns shown in the table 2(A) on the basis of the outputs from the first and second stages of the BIC status register 20, that is, if the BIC changing patterns are patterns representative of the frame changing points, the BIC pattern determination circuit 22 outputs a detection signal (e) and an address (f) of a pattern as detected.

In a case where no frame synchronization is settled, an output of a Qterminal of a JK flip-flop 26 becomes a high level, and the flip-flop 26 outputs a load signal (g) to a frame counter 32 via an AND circuit 28 and an OR circuit 30 at every timing that the frame changing point is detected. When the load signal (g) of the high level is applied from the frame counter 32, the address (f) is loaded into the frame counter 32 via a selector 34.

Thus, at a timing in which the frame changing point is detected, a frame synchronization catching operation is started, the address (f) is applied to a comparator 36 from the frame counter 32. At every timing in which the address (f) is coincident with a frame changing point detection address stored in advance in the comparator 36, the comparator 36 outputs a high-level signal. As far as the frame changing point is continuously detected by the BIC pattern determination circuit 22 at a timing in which the output from a comparator 36 is the high level, a counter 46 for frame synchronization backward protection is incremented by NOT circuits 38 and 40, and AND circuits 42 and 44.

Then, a count value of the counter 46 reaches the predetermined number of times for the frame synchronization backward protection, an output from an RCO terminal of the counter 46 is changed to a high level from a low level, and the output is applied to the JK flip-flop 26 via an OR circuit 48, and therefore, a frame synchronization signal from a Q terminal of the flip-flop 26 is made to be a high level, whereby the frame synchronization can be settled.

In addition, in a case where the frame synchronization has been established but the BIC pattern determination circuit 22 cannot detect the frame changing point at a predetermined timing shown by the frame count 32, a low-level signal is applied to a CLR terminal of the counter 46, and the counter 46 is reset.

It is to be noted that by further adding the following elements, the frame synchronization with high accuracy can be implemented.

Figure 21:
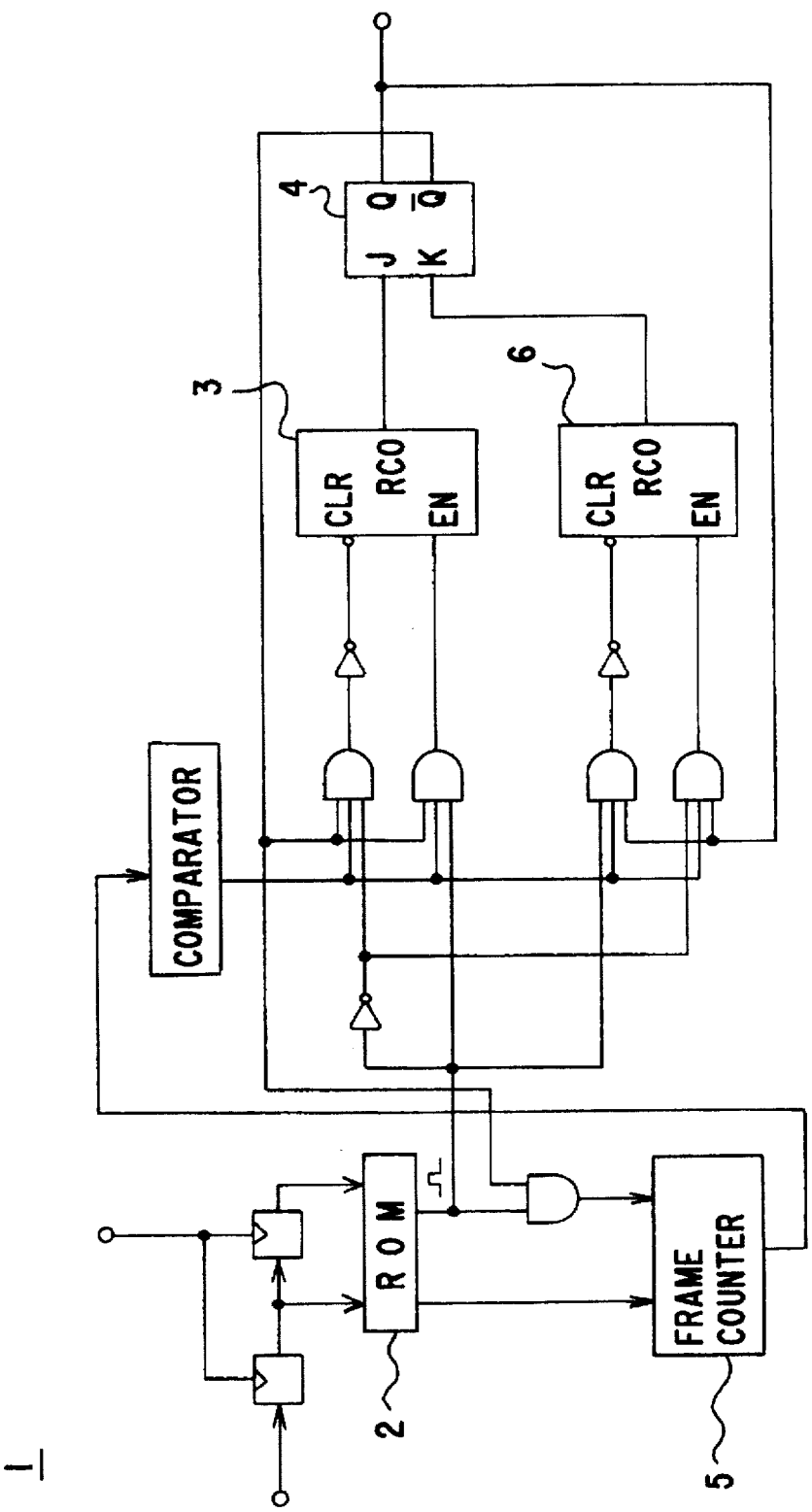
FIG. 21 is a circuit diagram showing related art.

Although the BIC status register 2 is constructed by two stages in the prior art frame-synchronous reproducing circuit 1 shown in FIG. 21, in the embodiment shown in FIG. 1, the BIC status register 20 is constructed by six stages, and according thereto, the BIC pattern determination circuit 24 capable of detecting the frame changing point with high accuracy is added.

The data shown in the table 2(B) are stored in the BIC pattern determination circuit 24, and if the continuous BIC changing pattern is (BIC1-BIC1-BIC3 BIC3-BIC4-BIC3) in an older order, the BIC pattern determination circuit 24 outputs an address of "17". If the continuous BIC changing pattern is (BIC4-BIC3 BIC3-BIC4-BIC2-BIC2) in an older order, an address of "138" is outputted. When the continuous BIC changing pattern is (BIC2-BIC2-BIC3-BIC3-BIC4-BIC3), an address of "153" is outputted, and if the continuous BIC changing pattern is (BIC4-BIC3-BIC3-BIC4-BIC1-BIC1), an address of "2" is outputted.

In addition, as seen from the table 2(B), in the respective BIC changing patterns for six blocks, frame changing points of (BIC4-BIC1), (BIC1-BIC3), (BIC4-BIC2) and (BIC2-BIC3) are included.

Now, with reference to the following table 3, a further specific description will be made.

TABLE 3

| Values of Stages of BIC Status Register | | | | | | Settlement of Frame Synchronization | Output Address |
|---|---|---|---|---|---|---|---|
| New | | | | | Old | | |
| 2 | 2 | 2 | 2 | 2 | 2 | x | |
| 3 | 2 | 2 | 2 | 2 | 2 | x | |
| 3 | 3 | 2 | 2 | 2 | 2 | x | |
| 4 | 3 | 3 | 2 | 2 | 2 | x | |
| 3 | 4 | 3 | 3 | 2 | 2 | o | 153 |
| 3 | 3 | 4 | 3 | 3 | 2 | x | |
| 4 | 3 | 3 | 4 | 3 | 3 | x | |

In the table 3, the frame changing point of (BIC2-BIC3) is indicated as one example. Furthermore, in the table 3, "x" indicates that the frame synchronization cannot be established, and "o" indicates that the frame synchronization can be established. In addition, the output address indicates an address to be loaded into the frame counter 32 at a timing in which the pattern is detected.

At a time that the BIC pattern determination circuit 24 detects the BIC changing patterns shown in the table 2(B), a load signal (i) and a load address (h) are outputted to the frame counter 32 from the BIC pattern determination circuit 24 through the OR circuit 30 and the selector 34. The OR circuit 30 and the selector 34 are provided for matching the outputs of the BIC pattern determination circuits 22 and 24 with each other. More specifically, the selector 34 selectively outputs the address (h) at a time that the load signal (i) is the high level, or the address (f) at a time that the load signal (i) is the low level. Furthermore, the OR circuit 30 makes OR of the output of the AND circuit 28 which passes the load signal (e) only when the frame synchronization is unestablished and the load signal (i). Thus, the erroneous address is prevented from being loaded into the frame counter 32.

Furthermore, because the frame changing point detected by the BIC pattern determination circuit 24 has sufficient accuracy, the load signal (i) is inputted to a J terminal of the JK flip-flop 26 through an OR circuit 48 so as to forcedly establish the frame synchronization.

Next, a counter 52 for frame synchronization forward protection will be described.

The counter 52 operates at a time in which the frame synchronization is established. More specifically, in a case where the frame counter 32 indicates the frame changing point detection position at a timing of the establishment of frame synchronization, but the frame changing point cannot be detected by the BIC pattern determination circuit 22, an output of an AND circuit 54 becomes a high level so as to operate the counter 52. Therefore, if the frame changing point is not detected by the BIC pattern determination circuit 22 at a true or normal timing indicated by the frame counter 32, the counter 52 is incremented, and when the frame changing point is detected by the BIC pattern determination circuit 22 at that timing, the counter 52 is reset. If a value of the counter 52 reaches the predetermined number of times for frame synchronization forward protection, a signal of a high level is outputted from an RCO terminal of the counter 52 to a K terminal of the JK flip-flop 26, and the frame synchronization signal which is outputted from the Q terminal of the JK flip-flop 26, i.e., from the terminal 50 and indicative of the establishment or non-established of the frame synchronization becomes the low level, and therefore, the frame synchronization does not become established.

Figure 2:
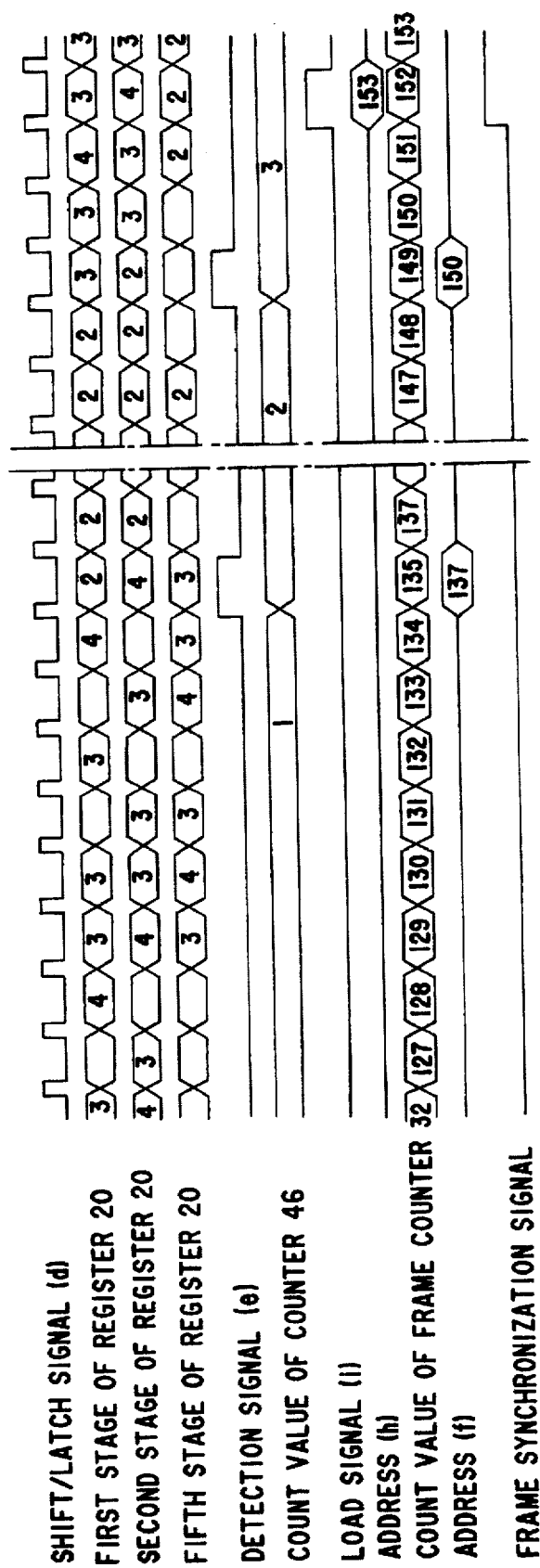
FIG. 2 is a timing chart showing one example of an operation of FIG. 1 embodiment.

With reference to FIG. 2, a more specific description will be made.

In a case where the signals outputted from the first and second stages of the BIC status register 20 indicate BIC2 and BIC4, respectively, the BIC pattern determination circuit 22 outputs the detection signal (e) of the high level, and the address (f) of "137". Then, the value of the frame counter 32 is changed to "137" from "135". Next, when the signals outputted from the first and second stages of the BIC status register 20 indicates BIC3 and BIC2, respectively, the BIC pattern determination circuit 22 outputs the detection signal (e) of the high level and the address (f) of "150".

Thereafter, in a case where the BIC changing patterns outputted from the first stage to the sixth stage of the BIC status register 20 indicates (BIC2-BIC2-BIC3-BIC3-BIC4-BIC3) shown in the table 2(B), the BIC pattern determination circuit 24 outputs the high-level load signal (i) and the address (h) of "153". Then, even though the value of the counter 46 does not reach the number of times for frame synchronization backward protection, the high-level load signal (i) is applied to the JK flip-flop 26 through the OR circuit 48, and therefore, the JK flip-flop 26 outputs the frame synchronization signal of the high level so as to establish the frame synchronization.

In the frame-synchronous reproducing circuit 10 of FIG. 1 embodiment, it is regarded that the frame changing point is detected if and when the BICs of the few or several packets before and after the frame changing point are coincident with the BIC changing patterns including the frame changing point. In the frame-synchronous reproducing circuit 10 shown in FIG. 1, in order to keep the accuracy for detecting the frame changing point and reduce the scale of the hardware, it is necessary to continuously detect the BICs utilized for detecting the frame changing point.

On the other hand, in order to detect the frame changing point with higher accuracy, it is necessary to determine the frame changing point on the basis of a large amount of information. The BIC structure in the frame of the mobile FM multiplex broadcasting is constructed in a manner that the frame is divided by a place where the BIC1 continues thirteen (13) times, a place where the (BIC3-BIC3-BIC4) continues forty-one (41) times, a place where the BIC2 continues thirteen (13) times, and a place where the (BIC3-BIC3-BIC4) continues forty-one (41) times. Therefore, the frame changing points by which the position within the frame can be specified are limited to four (4) places of (BIC1-BIC3), (BIC4-BIC2), (BIC2-BIC3) and (BIC4-BIC1).

If the arrangement of the BICs is roughly seen, it will be understood that the arrangement is divided into a portion where the BIC1 or the BIC2 continues and a portion where a set of (BIC3-BIC3-BIC4) continues. Therefore, in order to detect the frame changing point with higher accuracy, it is necessary to surely detect each of the frame changing points of (BIC1-BIC3), (BIC2-BIC3), (BIC4-BIC1), and (BIC4-BIC2). Therefore, it becomes effective that the continuous information of the BIC1 or the BIC2 and the continuous information of (BIC3-BIC3-BIC4) which have nothing to do with the frame changing point directly are positively utilized for detecting the frame changing point.

Figure 3:
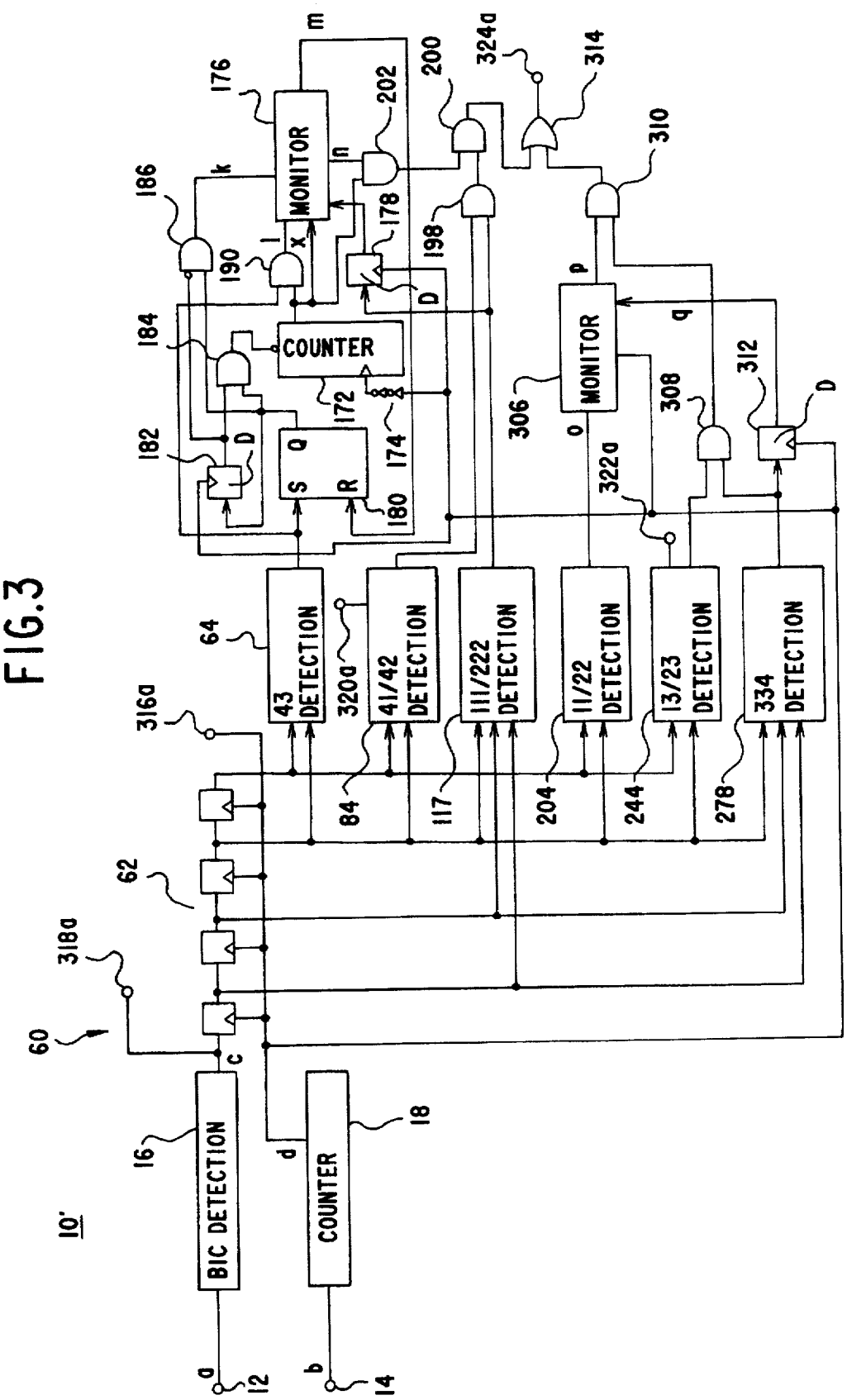
FIG. 3 is a circuit diagram showing a frame changing point detection circuit which is a portion of another embodiment according to the present invention.
Figure 4:
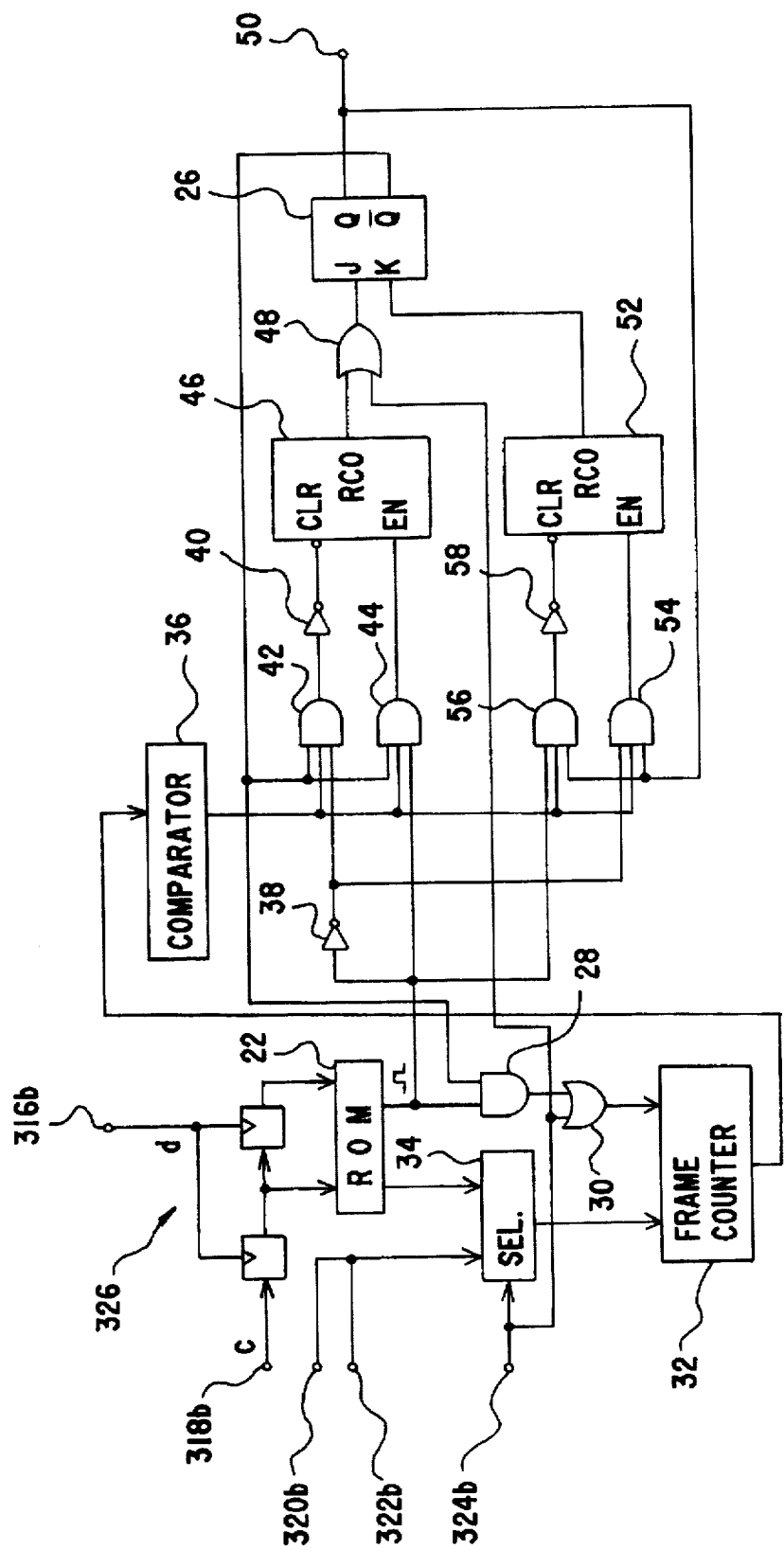
FIG. 4 is a circuit diagram showing a circuit connected to the frame changing point detection circuit shown in FIG. 3.

A frame-synchronous reproducing circuit 10' in which the frame synchronization can be established quickly and accurately on the basis of the above described design concept is shown in FIG. 3 and FIG. 4, for example. In the following, the frame-synchronous reproducing circuit 10' shown in FIG. 3 and FIG. 4 will be described. In addition, in the following, a description will be made on the assumption that the block synchronization has been established.

The frame-synchronous reproducing circuit 10' shown in FIG. 3 and FIG. 4 includes a frame changing point detection circuit 60 shown in FIG. 3. The frame changing point detection circuit 60 includes the terminals 12 and 14, and the reception data (a) is inputted to the terminal 12, and the clock signal (b) of the mobile FM multiplex broadcasting being synchronous with the reception data (a) is inputted to the terminal 14. The data transfer rate of the reception data (a) is 16 kbps, fop example.

The BIC detection circuit 16 determines whether or not the reception data (a) is within the allowable number of bits for the BIC error. If the reception data (a) is a pattern within the allowable number of bits fop the BIC error, the BIC detection circuit 16 determines the reception data (a) is which one of the BICs. That is, the BIC detection circuit 16 outputs the BIC status signal (c) of three (3) bits according to the aforementioned table 1 to a BIC status register The BIC status register 62 includes a shift register of four (4) stages, for example. The counter 18 is a 288-bit counter which is incremented in synchronous with the clock signal (b). Then, the counter 18 outputs the shift/latch signal (d) at every timing of the BIC detection position. In response to the shift/latch signal (d) from the counter 18, respective stages of the BIC status register 62 is shifted right, and the BIC status signal (c) from the BIC detection circuit 16 is latched into a first stage of the BIC status register 62. Therefore, signals outputted from the respective stages of the BIC status register 82 indicates what kinds of BICs are detected during the last three (3) blocks.

In the following, the structure and the operation for detecting the frame changing point of (BIC4-BIC1) by monitoring the appearance of the BIC changing pattern of (BIC4-BIC3) will be described.

A BIC43 detection circuit 64 receives outputs from third and fourth stages of the BIC status register 62, and when the output of the third stage indicates the BIC3 and the output of the fourth stage indicates the BIC4, the BIC43 detection circuit 64 outputs a signal (a set signal) of a high level indicating that the BIC changing pattern of (BIC4-BIC3) is detected.

Figure 5:
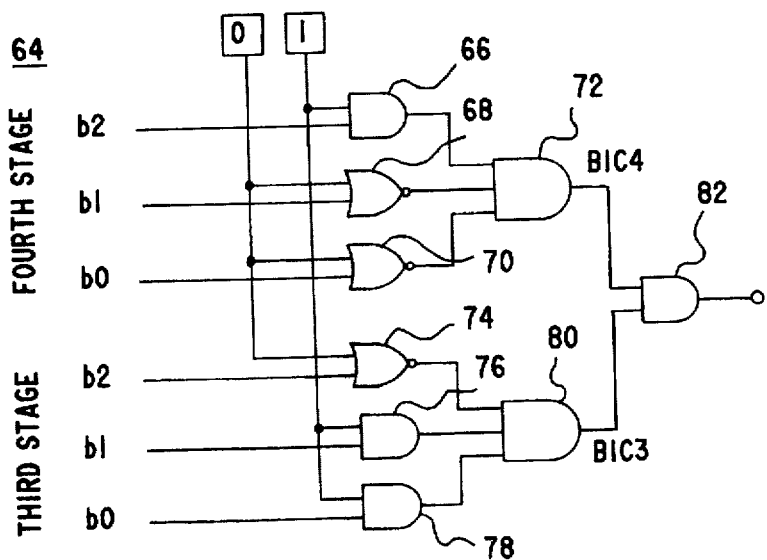
FIG. 5 is a circuit diagram showing one example of a BIC43 detection circuit.

The BIC43 detection circuit 64 is constructed as shown in FIG. 5, for example. The BIC43 detection circuit 64 shown in FIG. 5 includes an AND circuit 66, and NOR circuits 68 and 70 each having one input which receives the outputs b2, b1 and b0 of the three bits from the fourth stage of the BIC status register 62, respectively, and an AND circuit 72 which receives outputs of the circuits 66, 68 and 70. Furthermore, outputs b2, b1 and b0 of the three bits from the third stage of the BIC status register 62 are applied to one inputs of a NOR circuit 74 and AND circuits 76 and 78, and an AND circuit 80 receives outputs of the circuits 74, 76 and 78. Then, the AND circuit 72 outputs a high-level signal when the BIC4 is detected, and the AND circuit 80 outputs a high-level signal when the BIC3 is detected. Therefore, the BIC changing pattern of (BIC4-BIC3) is detected by the BIC43 detection circuit 64, and the high-level signal is outputted from the AND circuit 82. In addition, "1" is applied to each of other inputs of the AND circuits 66, 76 and 78, and "0" is applied to each of other inputs of the NOR circuits 68, 70 and 74.

A BIC41/42 detection circuit 84 outputs a high-level signal when the output of the third stage of the BIC status register 62 indicates the BIC1 or the BIC2 and an output of the fourth stage of the register 62 indicates the BIC4.

Figure 6:
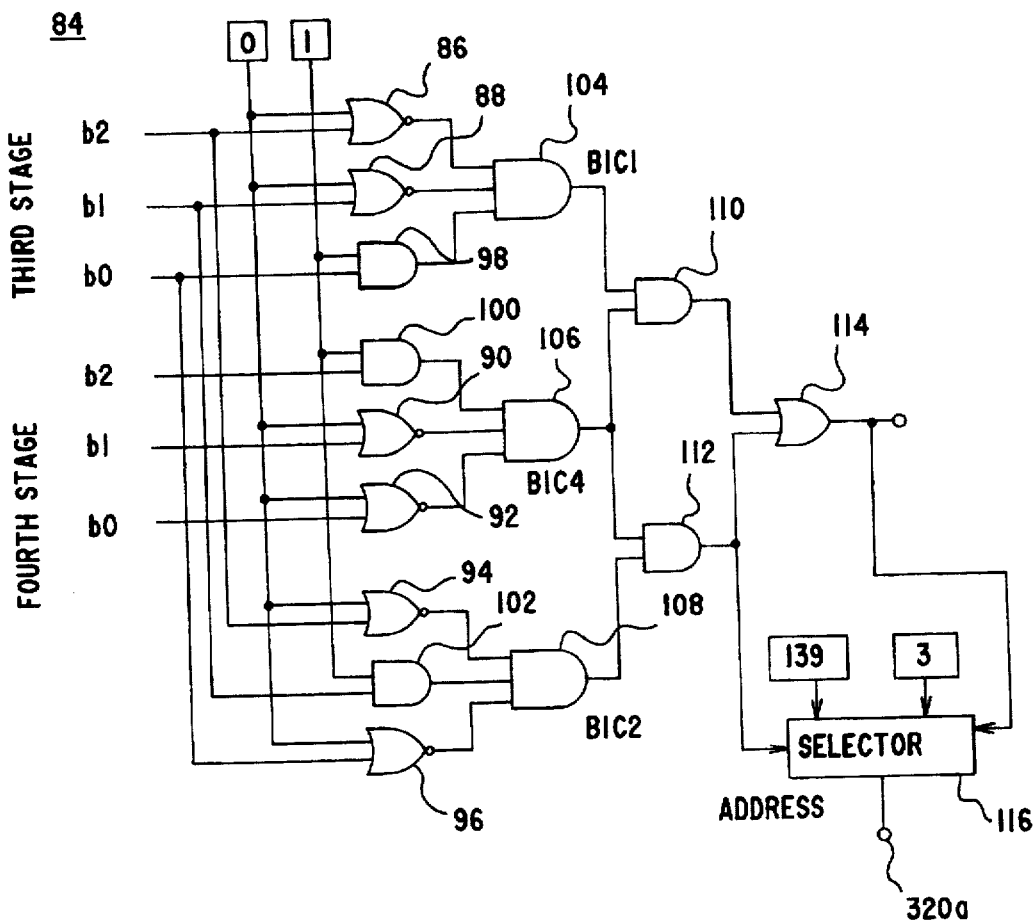
FIG. 6 is a circuit diagram showing one example of a BIC41/42 detection circuit.

The BIC41/42 detection circuit 84 is constructed as shown in FIG. 6, for example. The BIC41/42 detection circuit 84 includes NOR circuits 86–96, AND circuits 98–112 and an OR circuit 114. Then, when the high-level signals are outputted from the AND circuits 104 and 106, a high-level signal is outputted from the AND circuit 110, and therefore, a high-level signal indicating that the BIC changing pattern of (BIC4-BIC1) is detected is outputted from the OR circuit 114. Then, if the BIC changing pattern of (BIC4-BIC1) is detected, the address of "3" is outputted from a selector 116, and the selector 116 outputs the address of "139" when the BIC changing pattern of (BIC4-BIC2) is detected. In addition, the output of the OR circuit 114 is inputted to an enable terminal of the selector 116, and therefore, if the output of the OR circuit 114 is the low level, an output terminal of the selector 116 becomes a high-impedence state.

Furthermore, a BIC111/222 detection circuit 117 outputs a high-level signal when outputs of the first, second and third stages of the BIC status register 62 all indicates BIC1 or BIC2.

Figure 7:
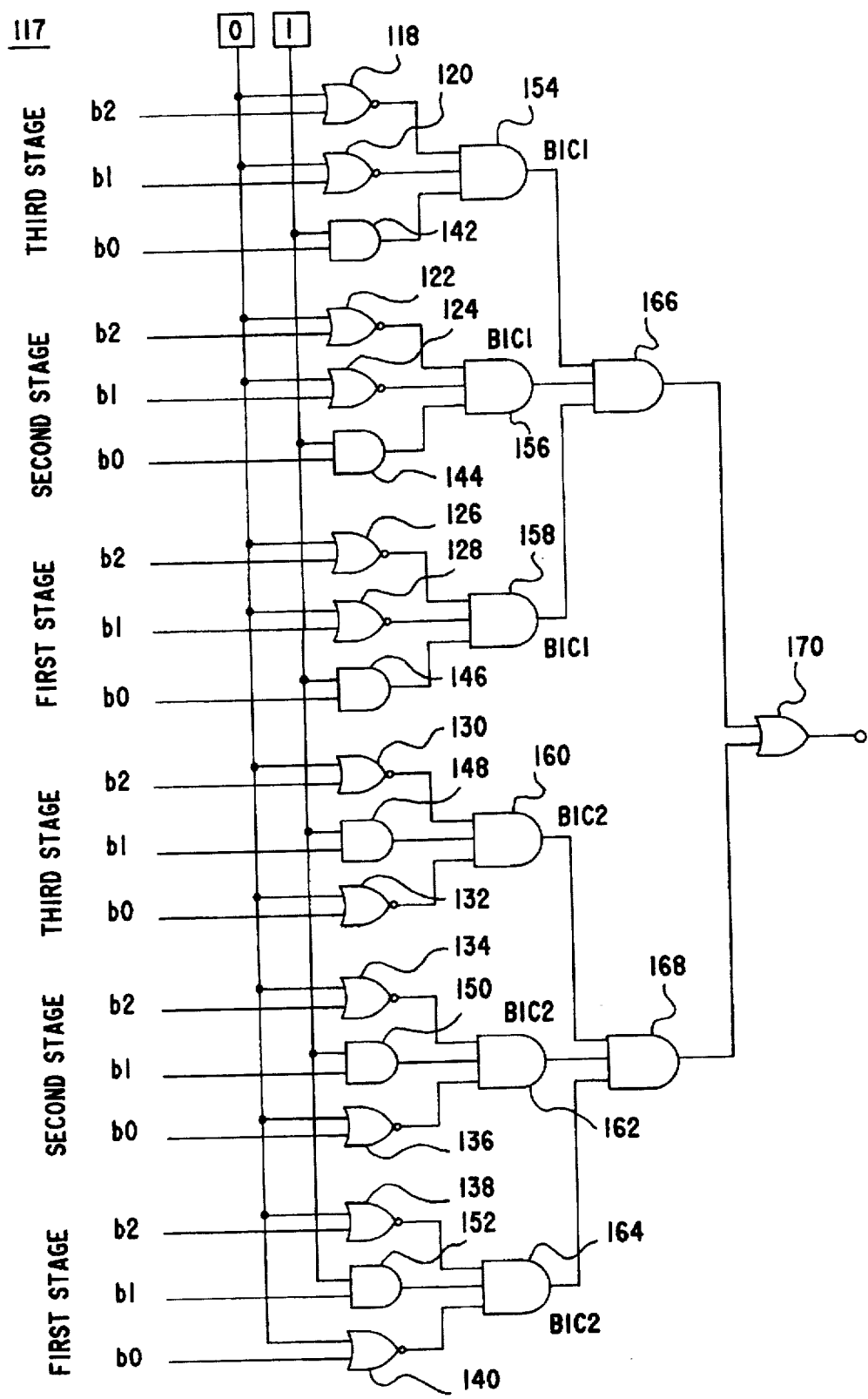
FIG. 7 is a circuit diagram showing one example of a BIC111/222 detection circuit.

The BIC111/222 detection circuit 117 is constructed as shown in FIG. 7, for example. The BIC111/222 detection circuit 117 includes NOR circuits 118–140, AND circuits 142–168 and an OR circuit 170. Then, if high-level signals indicative of the BIC1 are outputted from the AND circuits 154, 156 and 158, a high-level signal is outputted from the AND circuit 166, and therefore, a high-level signal indicating that the BIC changing pattern of (BIC1-BIC1-BIC1) is outputted from the OR circuit 170. Furthermore, high-level signals indicative of the BIC2 are outputted from the AND circuits 160, 162 and 164, a high-level signal is outputted from the AND circuit 168, and accordingly, a high-level signal indicating that the BIC changing pattern of (BIC2-BIC2-BIC2) is outputted from the OR circuit 170.

Returning to FIG. 3, a counter 172 is a counter of a modulo 3 (0, 1 and 2 is counted) with a clear function, and as a clock therefor, the signal (d) is utilized. The signal (d) is delayed by a delay circuit 174 by a delay time necessary for the BIC status register 62 and the BIC 43 detection circuit 64, and then applied to the counter 172. Furthermore, a BIC changing point monitor circuit 176 is reset by a reset signal (j) which is obtained by delaying the signal outputted from the BIC111/2222 detection circuit 117 by a D flip-Flop 178 at a time that the BIC1 or the BIC2 continues three or more times.

In the following, with reference to a timing chart in FIG. 9, an operation of this embodiment shown will be described.

If the BIC changing pattern of (BIC4-BIC3) is detected by the BIC43 detection circuit 64, a set signal is outputted to an RS flip-flop 180 from the BIC43 detection circuit 64. An output of the RS flip-flop 180 is changed to a high level from a low level in response to the set signal, but a timing that the counter 172 is transited to an active state from a reset state is after one block due to a reset signal applied by a D flip-flop 182 and an AND circuit 184. Furthermore, at a time that the output of the RS flip-flop 180 is changed to the high level from the low level, "1" is loaded in a first stage (a stage of "1") of a shift register 188 included in the BIC changing point monitor circuit 176 shown in FIG. 8 by a signal (k) which is obtained by gating the output of the D flip-flop 182 by a logic circuit 186.

The counter 172 thus brought into the active state outputs a high-level signal at a timing that the BIC changing pattern of (BIC4-BIC3) next appears, and therefore, if the set signal from the BIC43 detection circuit 64 is the high level at that timing, a high-level signal (1) is outputted from an AND circuit 190, and therefore, a value of the register 188 included in the BIC changing point monitor circuit 176 is incremented. That is, switches 192a to 192e in the BIC changing point monitor circuit 176 are switched to a lower side by the signal (1), and therefore, the shift register 188 is shifted right, and "1" is loaded into the first stage of the shift register 188.

In contrast, if the set signal from the BIC43 detection circuit 64 is the low level, the signal (1) from the AND circuit 190 becomes the low level, and therefore, the switches 192a to 192e are switched to an upper side, and therefore, the shift register 188 is shifted left, and "0" is loaded into the last stage of the shift register 188. Accordingly, the register value of the BIC changing point monitor circuit 176 is decremented.

That is, at every three blocks in which the BIC changing pattern of (BIC4-BIC3) appears, if the BIC changing pattern of (BIC4-BIC3) is detected, the register value of the BIC changing point monitor circuit 176 is decremented, but otherwise, the register value is incremented. In addition, a signal (x) from the counter 172 to the BIC changing point monitor circuit 176 becomes a clock for the shift register 188 of the BIC changing point monitor circuit 176.

In addition, at a timing that the first stage of the shift register 188 is changed from "1" to "0", a logic circuit 196 outputs a pulse signal (m) of a high level by the output of the first stage of the shift register 188 and an output of a delay circuit 194. The high-level pulse (m) is applied to a reset terminal of the RS flip-flop 180 to make the output of the RS flip-flop 180 in a high level and the counter 172 in a reset state, and therefore, the circuit is brought into a state for waiting for detection of the BIC changing pattern of (BIC4-BIC3). Such a function is especially effective for a case where the BIC changing pattern of (BIC4-BIC3) is erroneously detected.

As the above described operation is repeated, if the high-level signal from the BIC41/42 detection circuit 84 is outputted, the BIC changing point at that time can be enumerated as a candidate of the frame changing point; however, there is a possibility that the output of the BIC41/42 detection circuit 84 becomes the high level because the BIC3 is erroneously detected as the BIC1 (or BIC2), and therefore, in this embodiment shown, a candidate signal of a high level from an AND gate 198 is outputted only when the output of the BIC111/222 detection circuit 117 becomes the high level such that the BIC changing point is regarded as the candidate of the frame changing point.

Therefore, in a modified example, the BIC111/222 detection circuit 117 is changed as a BIC1×1/2×2 detection circuit ("x" may be other than 1–4), and the number of the blocks referred to in detecting the BIC changing pattern may be increased or decreased.

In addition, it is to be noted that an operation for checking which one of the BIC1 and the BIC2 is detected in the BIC41/42 detection circuit 84 and the BIC111/222 detection circuit 117 is omitted because the output of the third stage of the BIC status register 62 is commonly used for the inputs of the circuits 84 and 117.

The output from the AND circuit 198, which is the candidate signal of the frame changing point thus selected is applied to an AND circuit 200. Furthermore, an output (n) from a predetermined stage of the shift register 188 within the BIC changing point monitor circuit 176 and the output from the counter 172 indicative of the pattern detection position of (BIC4-BIC3) are inputted to an AND circuit 202, and an output of the AND circuit 202 is then applied to the AND circuit 200. Thus, by applying the outputs to the AND circuit 200 from the AND circuits 198 and 202, and the both outputs are ANDed by the AND circuit 200, it is possible to detect whether or not the candidate of the frame changing point is a true frame changing point. Accordingly, it is possible to detect whether or not the BIC changing pattern of (BIC4-BIC1 or BIC2) appears at a detection timing of (BIC4-BIC3), and if it appears, a frame changing point detection signal of a high level is outputted.

In addition, in a case where the number of times of the detection of the pattern of (BIC4-BIC3) is small, there is a possibility that the pattern of (BIC4-BIC1 or BIC2) is erroneously detected, and therefore, it is required that the pattern of (BIC4-BIC3) is detected more than the predetermined number of times to increase the detection accuracy. Therefore, the frame changing point detection signal is decided only a case where all the above described checks are passed.

The shift register 188 included in the BIC changing point monitor circuit 176 is constructed in a total of sixteen (16) stages, and the above described "predetermined stage" from which the signal (n) is outputted is set at an eighth stage from the first stage thereof. The larger the number of the stages for outputting the signal (n), the greater the accuracy; however, it takes a long time because a greater number of the patterns of (BIC4-BIC3) are to be detected, and therefore, in this embodiment shown, "the predetermined stage" is set at the eighth stage.

Figure 20:
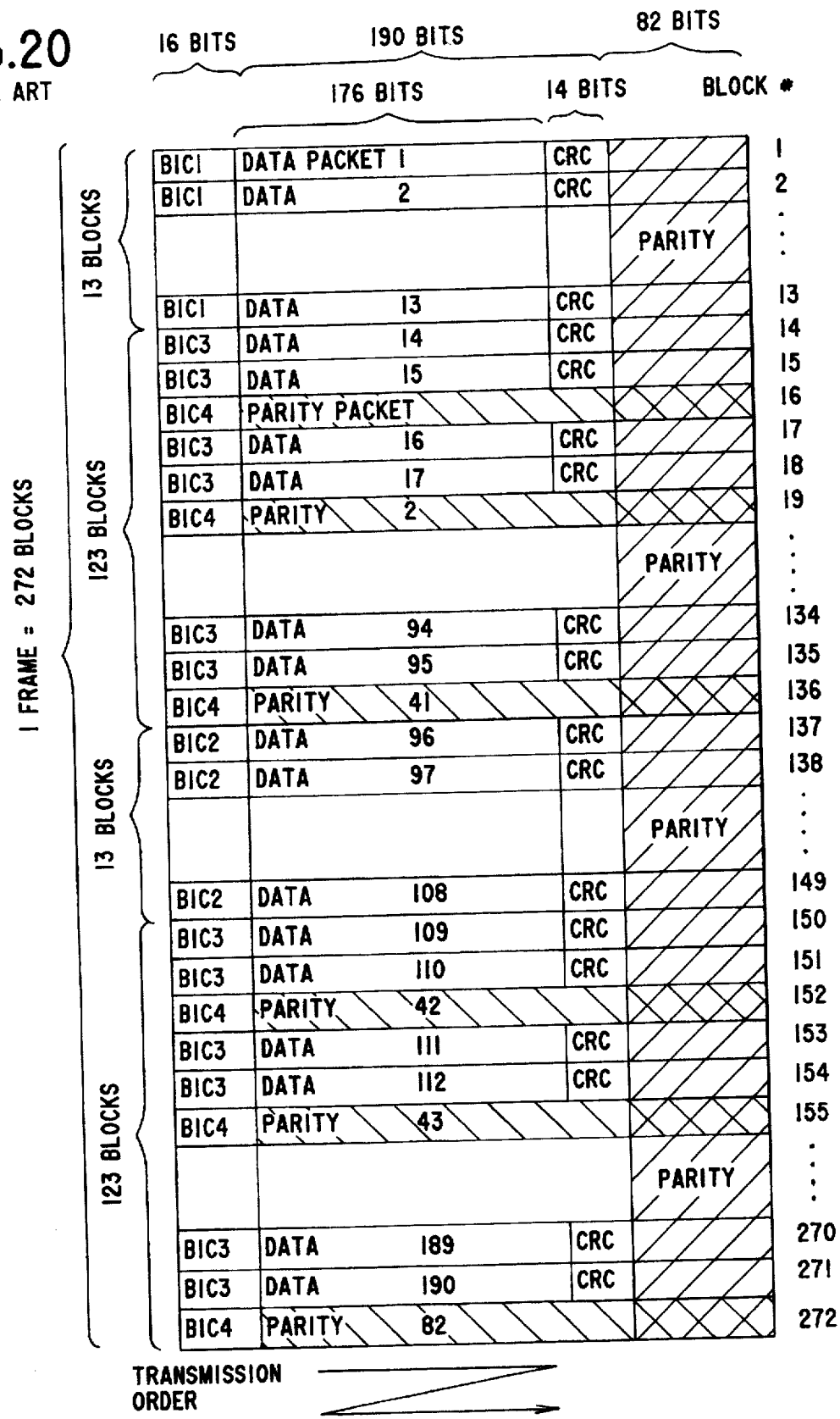
FIG. 20 is an illustrative view showing one example of frame structure of a mobile FM multiplex broadcasting.

Furthermore, in a case where it seems that the frame changing point of (BIC4-BIC1 or BIC2) has passed, in order to detect a next frame changing point of (BIC4-BIC2 or BIC1), the shift register 188 of the BIC changing point monitor circuit 176 is to be reset. As shown in FIG. 20, places where the pattern of (BIC4-BIC3) occurs are different from each other after the BIC1 continues or after the BIC2 continues, and therefore, if the number of stages of the shift register 188 of the BIC changing point monitor circuit 176 is small, the shift register 188 is necessarily reset at the place where the BIC1 continues and the place where the BIC2 continues. In contrast, in this embodiment shown, in order to increase the detection accuracy of the frame changing point, the shift register 188 is forcedly reset by the reset signal (j) obtained by delaying the output of the BIC 111/222 detection circuit 117 by the D flip-flop 178.

In addition, a reason why the output of the BIC111/222 detection circuit 117 is delayed by one packet by the D flip-flop 178 and applied to the reset signal (j) for the shift register 188 is that the detection timing of the frame changing point and the input timing of the reset signal (j) are deviated from each other. That is, the reason is that the shift register 188 is to be reset by the reset signal (j) after the frame changing point is detected.

Next, the structure and the operation for detecting the frame changing point to (BIC1 or BIC2-BIC3) by monitoring the appearance situation of the BIC changing pattern of (BIC1 or BIC2-BIC1 or BIC2) will be described.

A BIC11/22 detection circuit 204 receives outputs from the third and fourth stages of the BIC status register 62, and if the outputs of the third and fourth stages indicate the BIC1 or the BIC2, respectively, the BIC11/22 detection circuit 204 outputs a high-level signal indicating that the BIC changing pattern of (BIC1 or BIC2-BIC1 or BIC2) is detected.

Figure 10:
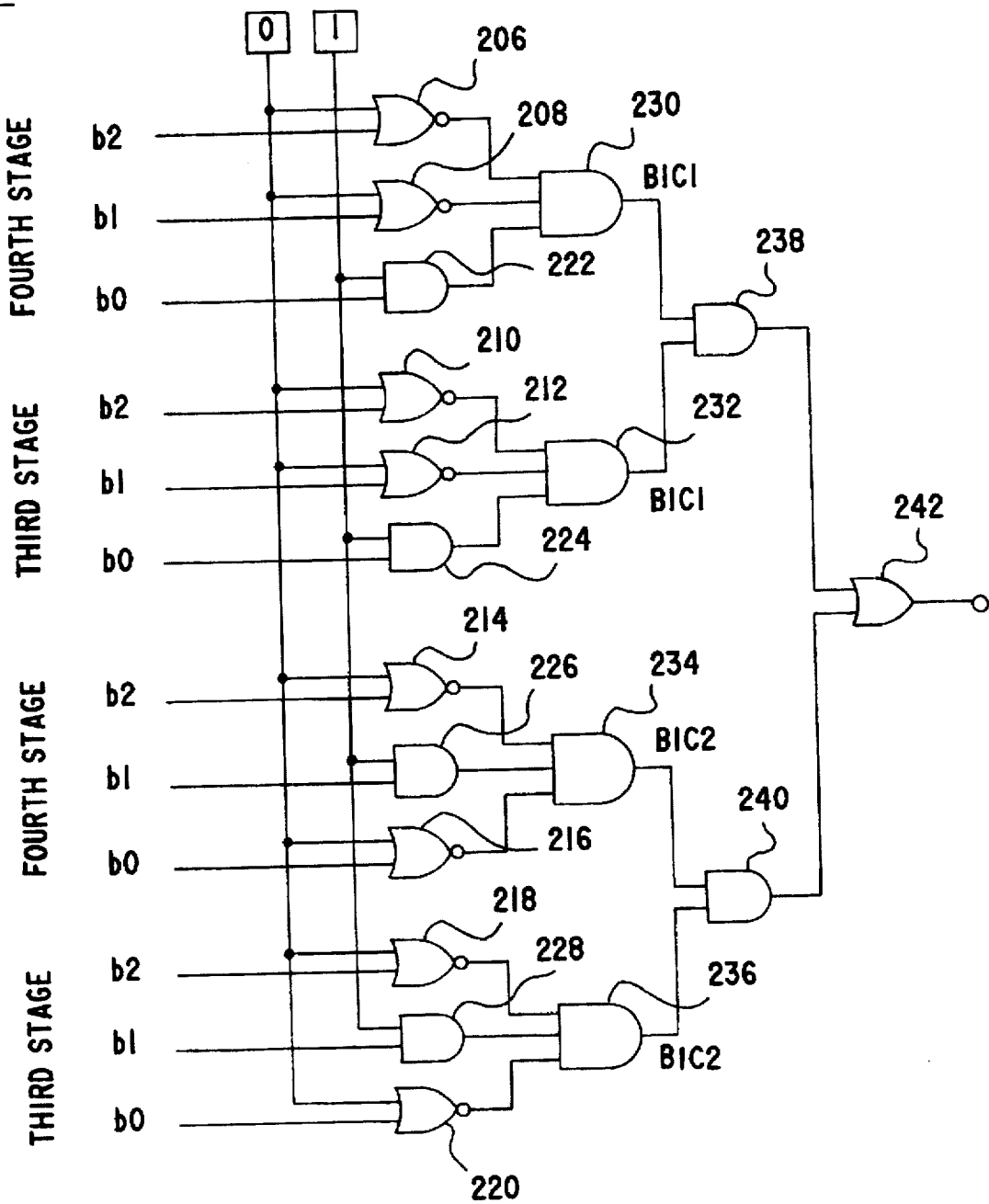
FIG. 10 is a circuit diagram showing one example of a BIC11/22 detection circuit.

The BIC11/22 detection circuit 204 is constructed as shown in FIG. 10, for example. The BIC11/22 detection circuit 204 shown in FIG. 10 includes NOR circuits 206 to 220, AND circuits 222 to 240, and an OR circuit 242. Then, if the AND circuits 230 and 232 detect the BIC1, respectively, and output the high-level signals, the AND circuit 238 outputs a high-level signal, and accordingly, a high-level signal indicating that the BIC changing pattern of (BIC1-BIC1) is detected is outputted from the OR circuit 242. Furthermore, if the AND circuits 234 and 236 detect the BIC2, respectively, and output the high-level signal, the AND circuit 240 outputs a high-level signal, and accordingly, a high-level signal (o) representing that the BIC changing pattern of (BIC2-BIC2) is detected is outputted from the OR circuit 242.

A BIC13/23 detection circuit 244 receives outputs of the third and fourth stages of the BIC status register 62, and in a case where the output from the third stage indicates the BIC3 and the output from the fourth stage indicates the BIC1 or the BIC2, the BIC13/23 detection circuit 244 outputs a high-level signal.

Figure 11:
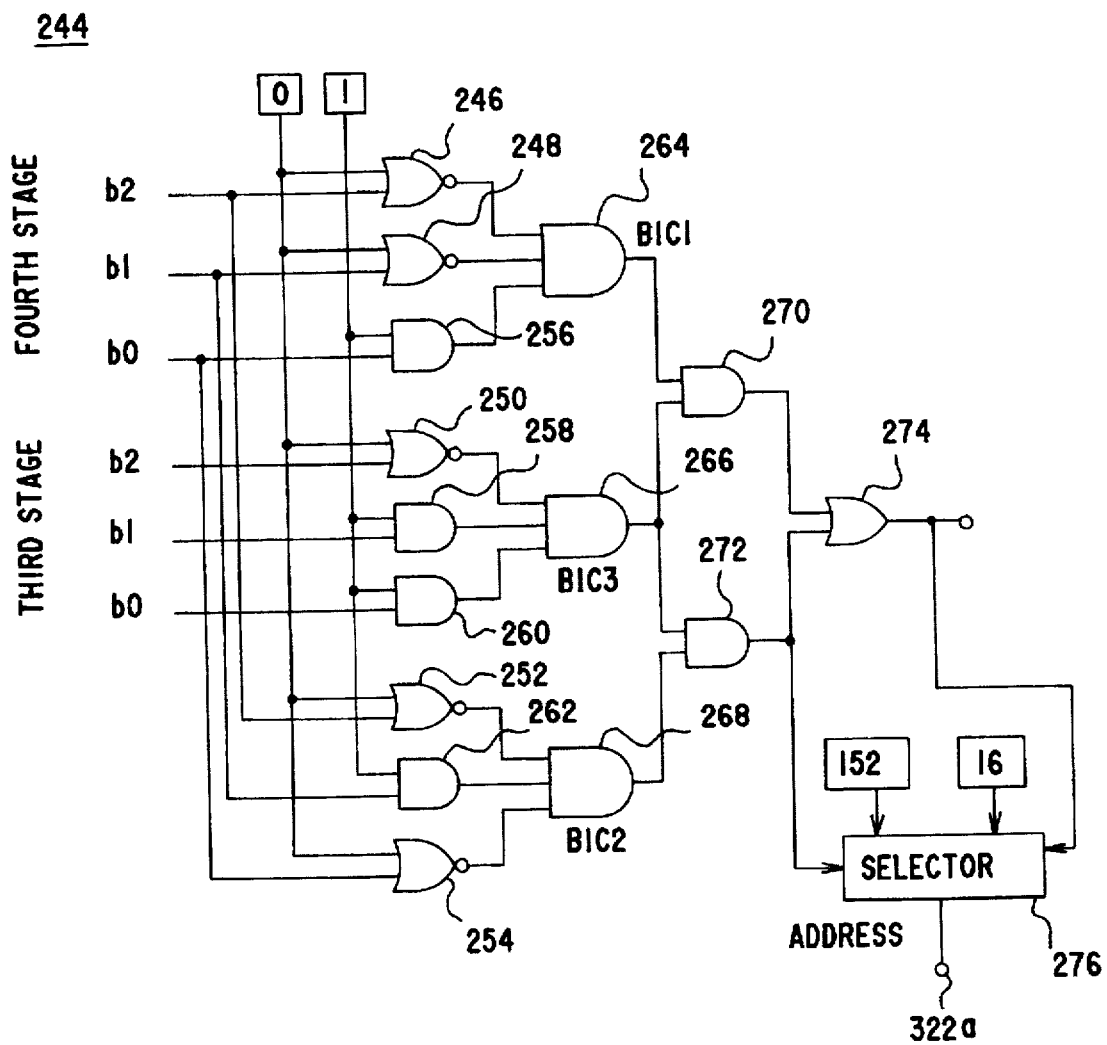
FIG. 11 is a circuit diagram showing one example of a BIC13/23 detection circuit.

The BIC13/23 detection circuit 244 is constructed as shown in FIG. 11, for example. The BIC13/23 detection circuit 244 shown in FIG. 11 includes NOR circuits 246 to 254, AND circuits 256 to 272, and an OR circuit 274. If the AND circuits 264 and 266 detect the BIC1 and the BIC3, respectively, and output the high-level signals, the AND circuit 270 outputs a high-level signal, and accordingly, a high-level signal indicating that the BIC changing pattern of (BIC1-BIC3) is detected is outputted from the OR circuit 274. Furthermore, if the AND circuits 266 and 268 detect the BIC3 and the BIC2, respectively, and output the high-level signal, a high-level signal is outputted from the AND circuit 272, and therefore, a high level-signal representing that the BIC changing pattern of (BIC2-BIC3) is detected is outputted from the OR circuit 274. Then, if the BIC changing pattern of (BIC1-BIC3) is detected, the address of "16" is outputted from a selector 276, and if the BIC changing pattern of (BIC2-BIC3) is detected, the address of "152" is outputted from the selector 276. In addition, an output of the OR circuit 274 is applied to an enable signal of the selector 276, and therefore, only when the output of the OR circuit 274 is the high level, the selector 276 outputs the address.

Furthermore, a BIC334 detection circuit 278 receives outputs from the first, second and third stages of the BIC status register 62, and in a case where the outputs of the first, second and third stages indicate the BIC4, BIC3 and BIC3, the BIC334 detection circuit 278 outputs a signal of a high level.

Figure 12:
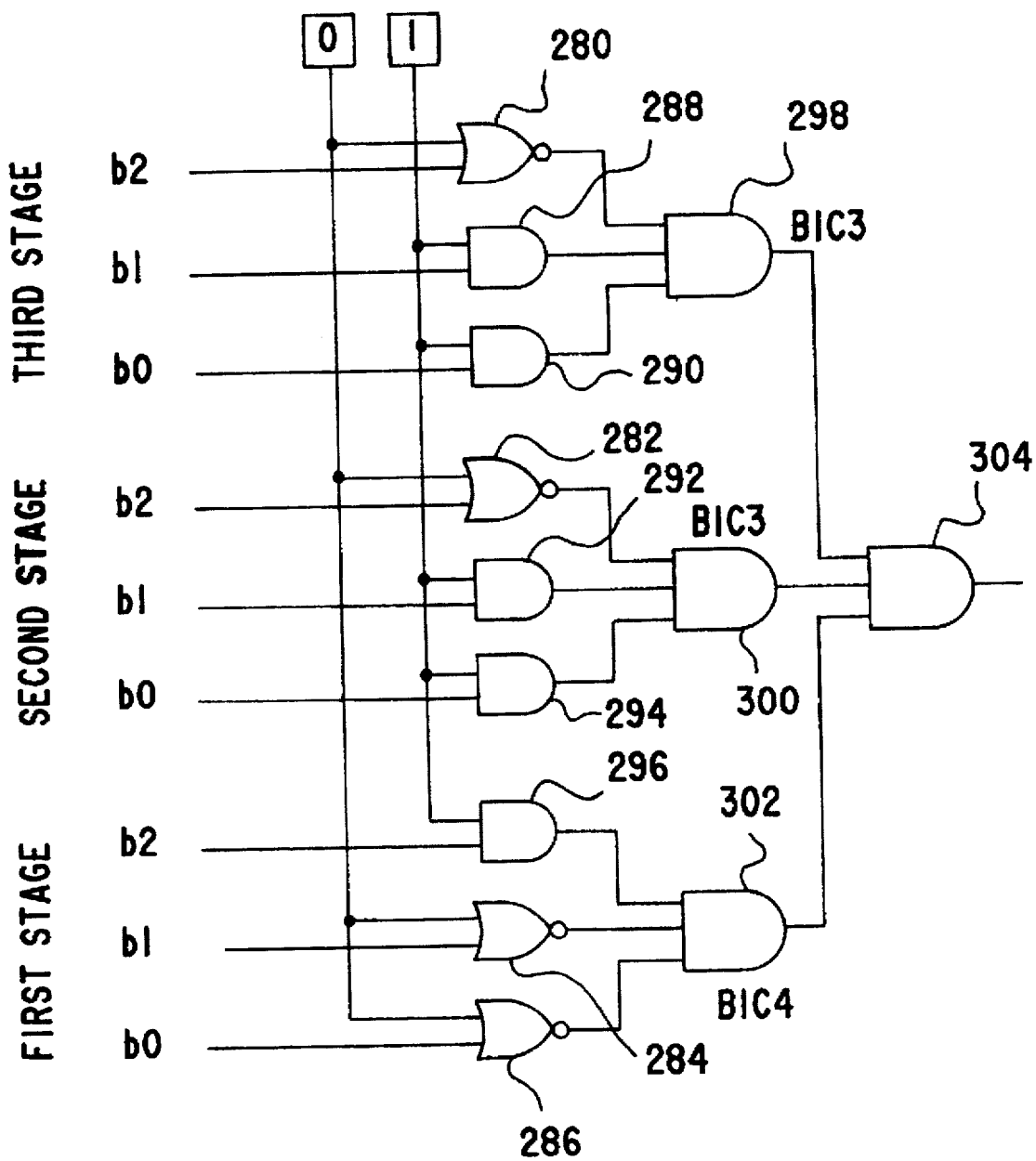
FIG. 12 is a circuit diagram showing one example of a BIC334 detection circuit.

The BIC334 detection circuit 278 is constructed as shown in FIG. 12, for example. The BIC334 detection circuit 278 shown in FIG. 12 includes NOR circuits 280 to 286, and AND circuits 288 to 304. When the AND circuits 298, 300 and 302 detect the BIC3, BIC3 and BIC4, respectively, the AND circuit 304 outputs a high-level signal representing that the BIC changing pattern of (BIC3-BIC3-BIC4) is detected.

In the following, with reference to a timing chart shown in FIG. 13, operations of these circuits will be described.

First, if the BIC11/22 detection circuit 204 detects the BIC changing pattern of (BIC1-BIC1), the BIC11/22 detection circuit 204 outputs the high-level signal (o) which is then applied to a BIC changing point monitor circuit 306. The BIC changing point monitor circuit 306 is utilized for detecting the frame changing point of (BIC1 or BIC2-BIC3). The BIC changing point monitor circuit 306 is also constructed as shown in FIG. 8, and in this case, the shift register 188 is constructed by nine (9) stages in total, and because of a reason similar to that of the BIC changing point monitor circuit 176, the "predetermined stage" from which a signal (p) is withdrawn is set at a sixth stage, for example.

Figure 8:
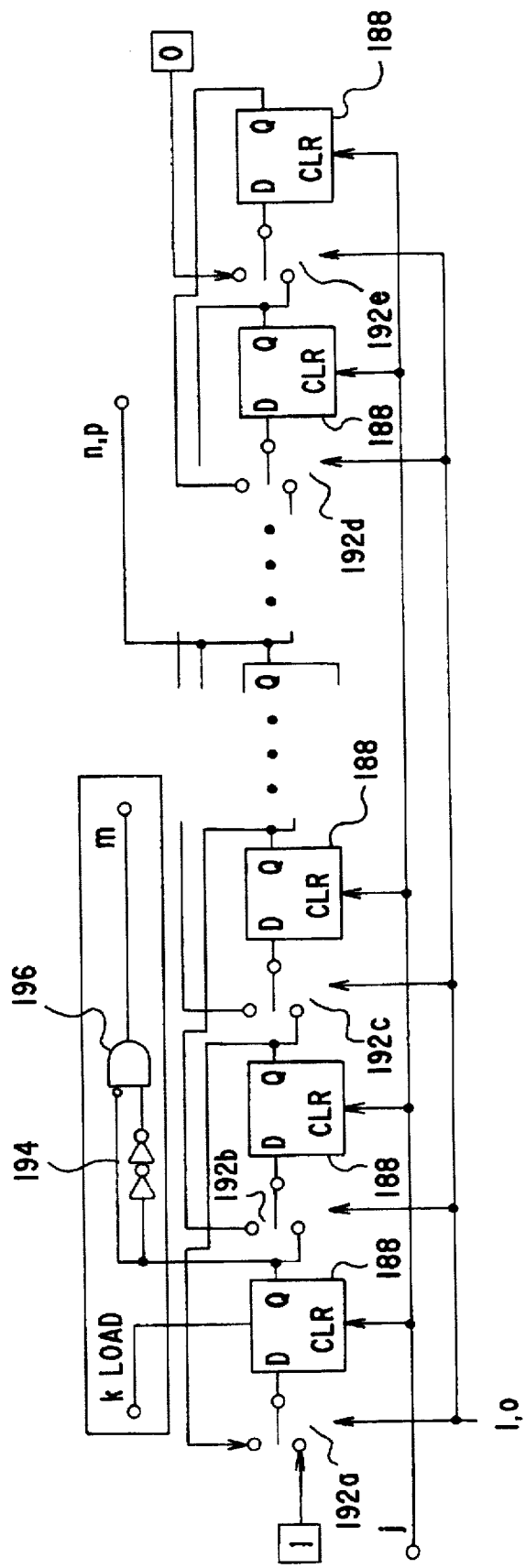
FIG. 8 is a circuit diagram showing one example of a BIC changing point monitor.

As shown in FIG. 8, the signal (o) functions as a switching signal for the BIC changing point monitor circuit 306. If the signal (o) is the high level, the switches 192a to 192e are switched to a lower side, and therefore, the shift register 188 is shifted right, and "1" is loaded into the first stage of the shift register 188. In contrast, if the BIC changing pattern of (BIC1-BIC1) is not detected by the BIC11/22 detection circuit 204, the signal (o) becomes the low level, and therefore, the switches 192a to 192e are switched to an upper side, and accordingly, the shift register 188 is shifted left, and "0" is loaded into the last stage of the shift register 188.

Therefore, the register value of the BIC changing point monitor circuit 306 is incremented at a time that the BIC changing pattern of (BIC1 or BIC2-BIC1 or BIC2) is detected by the BIC11/22 detection circuit 204, and otherwise, the register value is decremented. In detecting the frame changing point of (BIC1 or BIC2 BIC3), only when the outputs from the BIC13/23 detection circuit 244 and the BIC334 detection circuit 278 are both the high levels, and the signal (b) outputted from the predetermined stage (the sixth stage in this embodiment shown) of the shift register 188 within the BIC changing point monitor circuit 306 is the high level, the frame changing point detection signal of a high level is outputted. Such a determination is performed by the AND circuits 308 and 310.

The transition to the reset state of the shift register 188 included in the BIC changing point monitor circuit 306 is gradually performed at the place where the set of (BIC3-BIC3-BIC4) continues; however, in this embodiment shown, in order to make the detection accuracy of the frame changing point of (BIC1 or BIC2-BIC3) increase, in a case where the signal outputted from the BIC334 detection circuit 278 is the high level, that in a case where a reset signal (q) outputted from a D flip-flop 312 with being delayed by one packet becomes the high level, the shift register 188 is forcedly reset.

In the above described frame changing point detection circuit 60, the frame changing point detection signal of (BIC4-BIC1 or BIC2) and the frame changing point detection signal of (BIC1 or BIC2-BIC3) which are respectively outputted from the AND circuits 200 and 310 are outputted through an OR circuit 314.

Figure 9:
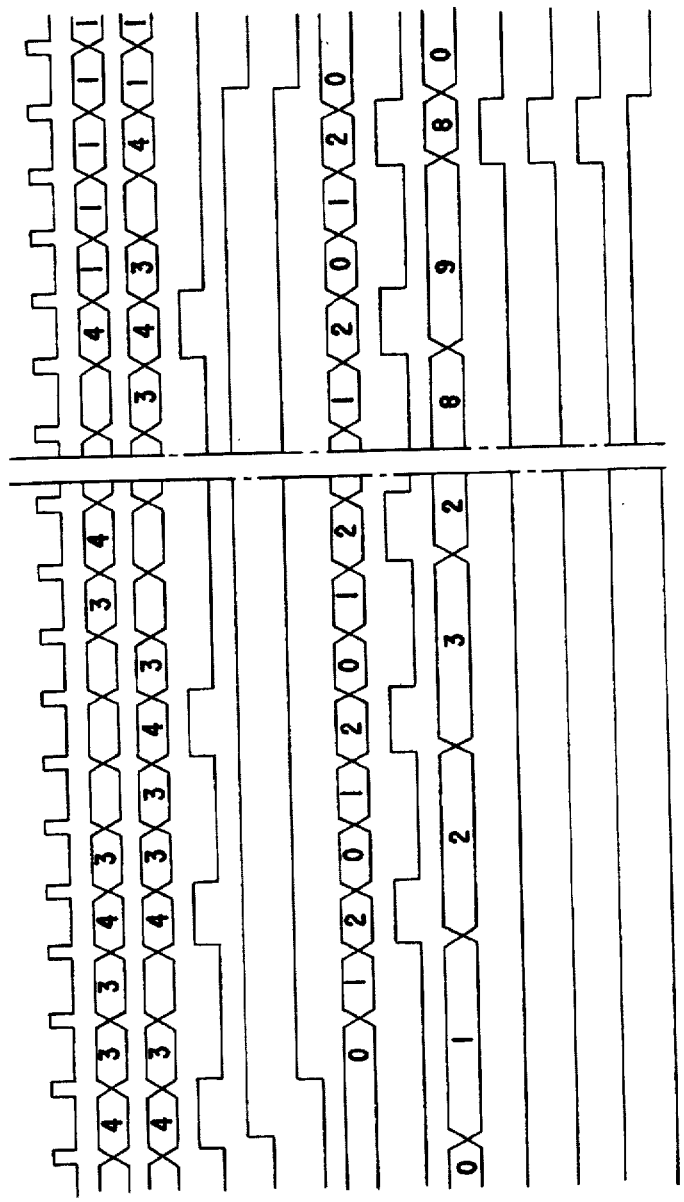
FIG. 9 is a timing chart showing one example of a case where the embodiment shown in FIG. 3 and FIG. 4 detects a pattern of (BIC4-BIC1)

In brief, with reference to FIG. 9, if the output of the counter 172 is the high level and the signal (n) from the BIC changing point monitor circuit 176 is the high level, the output from the AND circuit 202 also becomes the high level. At this time, if the output from the BIC41/42 detection circuit 84 and the output from the BIC111/222 detection circuit 117 are also the high level, the output from the AND circuit 198 also become the high level. Accordingly, when the output from the AND circuits 198 and 202 are the high levels, the frame changing point detection signal of the high level is outputted from a terminal 324a through the AND circuit 200 and the OR circuit 314.

Figure 13:
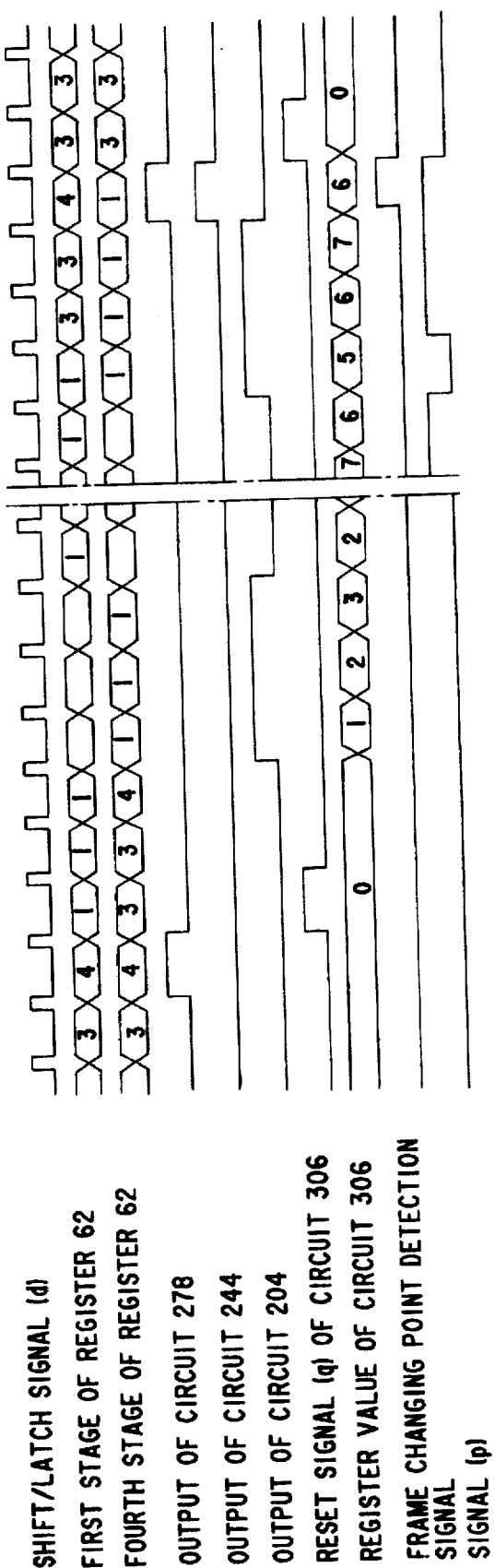
FIG. 13 is a timing chart showing one example of an operation of a case where the embodiment shown in FIG. 3 and FIG. 4 detects a pattern of (BIC1-BIC3)

Furthermore, with reference to FIG. 13, when the output from the BIC13/23 detection circuit 244 and the output from the BIC334 detection circuit 278 are the high levels, respectively, the output from the AND circuit 308 becomes the high level. At this time, if the signal (b) from the BIC changing point monitor circuit 306 is the high level, the frame changing point detection signal of the high level is outputted from the terminal 324a through the AND circuit 310 and the OR circuit 314.

In addition, respective terminals 316a, 318a, 320a, 322a and 324a shown in FIG. 3 are connected to corresponding terminals 316b, 318b, 320b, 322b and 324b shown in FIG. 4. More specifically, the shift/latch signal (d) from the counter 18 is applied to a BIC status register 326, and the BIC status signal (c) from the BIC detection circuit 16 is outputted from the first stage of the shift register included in the BIC status register 326. Furthermore, the addresses respectively outputted from the BIC41/42 detection circuit 84 and the BIC13/23 detection circuit 244, and the frame changing point detection signal from the OR circuit 314 are applied to the selector 34.

With reference to FIG. 4, when the frame changing point detection signal is applied to the selector 34 from the terminal 324b, the address from the terminal 320b or 322b is set into the frame counter 32 via the selector 34. In addition, one of the terminals 320b and 322b is a high-impedence state. Furthermore, if the frame changing point detection signal inputted to the terminal 324b is applied to the JK flip-flop 26 via the OR circuit 48, the JK flip-flop 26 outputs the frame synchronization signal of the high level to settle the frame synchronization.

In addition, in the BIC pattern determination circuit 22 composed of a ROM, the BIC changing patterns and the output addresses are stored shown in the table 2(A) similar to the embodiment shown in FIG. 1, and the frame changing point is detected by comparing the BIC changing pattern outputted from the BIC status register 326 and the BIC changing patterns shown in the table 2(A). Since other portions of the structure are similar to that of the embodiment shown in FIG. 1, by applying the same reference numerals, a duplicate description will be omitted here.

In the frame-synchronous reproducing circuit 10' described above, with positively utilizing the continuous information of the BIC1 or the BIC2 or the BIC changing pattern of (BIC3-BIC3-BIC4), by incrementing or decrementing according to whether or not the predetermined BIC changing pattern is continuously detected, it is possible to recognize how many degrees a BIC changing pattern is continuously detected. Therefore, it is possible to prevent the frame changing point from being erroneously detected by utilizing the continuous information.

Furthermore, by separating the BIC41/42 detection circuit 84 and the BIC13/23 detection circuit 244 from each other so as to intend to optimize the detection circuits, it is possible to detect the frame changing point with more accurately. Furthermore, by separating the BIC41/42 detection circuit 84 and the BIC13/23 detection circuit 244 from each other, it is possible to distinguish the frame changing point of (BIC1-BIC3) and the frame changing point of (BIC2-BIC3) from each other, and approximately separate the frame changing point of (BIC4-BIC1) and the frame changing point (BIC4-BIC2) from each other. Such separations are much indebted to the BIC arrangement in the format by the mobile FM multiplex broadcasting (see FIG. 20).

That is, after the detection place of the frame changing point of (BIC1-BIC3), the set of (BIC -BIC3-BIC4) continues, and therefore, the BIC changing point monitor circuit 306 which monitors the number of continuous BIC1 is reset or initialized until the place where the BIC2 continues. This can be also applied to the detection of the frame changing point of (BIC2-BIC3).

On the other hand, the frame changing point of (BIC4-BIC1) is detected by positively utilizing the continuous information appeared at every three packets of (BIC4-BIC3); however, there are only thirteen (13) BIC1 after the detection position of the frame changing point of (BIC4-BIC1), and this thirteen (13) is indivisible by three (3), and therefore, the BIC changing point monitor circuit 176 is initialized by the pattern of (BIC4-BIC3) after the BIC1. That is, after the thirteen (13) BIC1 continue, since the pattern of (BIC4-BIC3) cannot be detected at a desired timing, the changing point monitor circuit 176 is initialized. This can be also applied to the detection of the frame changing point of (BIC4-BIC2).

In addition, in order to effectively utilize the above described function, a maximum count value of the BIC changing point monitor circuit 176 or 306 becomes important. Therefore, in this embodiment shown, as described above, the BIC changing point monitor circuit 176 is constructed by sixteen (16) stages, and the BIC changing point monitor circuit 306 is constructed by nine (9) stages.

Furthermore, since the frame changing point of (BIC4-BIC1 or BIC2) is arranged after three packets from the pattern of (BIC4-BIC3) just before, by detecting the frame changing point of (BIC4-BIC1 or BIC2) with utilizing the detection timing of (BIC4-BIC3) in the BIC changing point monitor circuit 176, it is possible to implement the detection of the frame changing point with higher accuracy.

In contrast, the accuracy of the detection of the frame changing point of (BIC1 or BIC2-BIC3) is slightly inferior to the accuracy of the frame changing point detection in which the frame changing point of (BIC4-BIC1 or BIC2) is detected with utilizing the detection timing of (BIC4-BIC3). Since only the BIC1 or BIC2 continues before the frame changing point of (BIC1 or BIC2-BIC3), it is impossible to utilize the detection timing of (BIC4-BIC3) as different from the detection of the frame changing point of (BIC4-BIC1 or BIC2).

Therefore, by only a circuit by which the frame changing point of (BIC4-BIC1 or BIC2) can be detected may be utilized alone for detecting the frame changing point. In such a case, the frame changing point can be detected with high accuracy.

According to the above described frame-synchronous reproducing circuit 10', since the frame synchronization can be established at a time that the BIC changing pattern before and after the frame changing point are continuously detected with a predetermined interval and a plurality number of times, it is possible to reduce the scale of the hardware while the detection accuracy of the frame changing point is kept.

In addition, in the above described embodiment, an example that the number of kinds of the BICs is four (4); however, the number of kinds of the BICs may be an arbitrary value, and in the following, a case of two kinds and a case of three kinds will be described.

Figure 14:
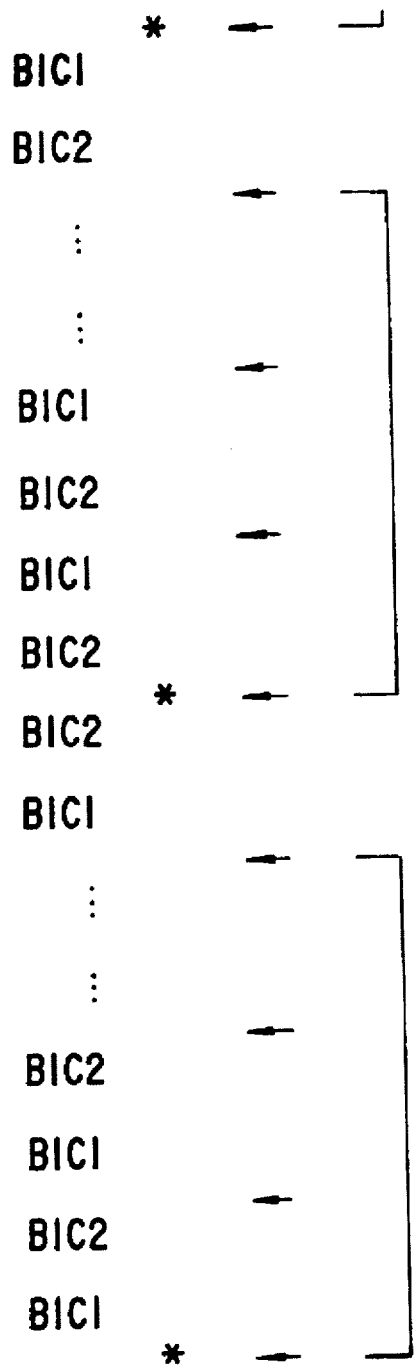
FIG. 14 is an illustrative view showing one example of a BIC arrangement of a case where the number of kinds of BICs is two (2).

First, in a case where the number of kinds of the BICs is two (2), one example of the BIC arrangement is shown in FIG. 14. In FIG. 14, the BICs include the BIC1 and the BIC2, and the frame changing point of (BIC2-BIC2) exists at an appearance scheduled position of a sub-changing point of (BIC2-BIC1), and the frame changing point of (BIC1-BIC1) exists at an appearance scheduled position of a sub-changing point of (BIC1-BIC2). In addition, in FIG. 14, a symbol of star indicates the frame changing point, and a left-direction arrow mark indicates the sub-changing point.

Figure 15:
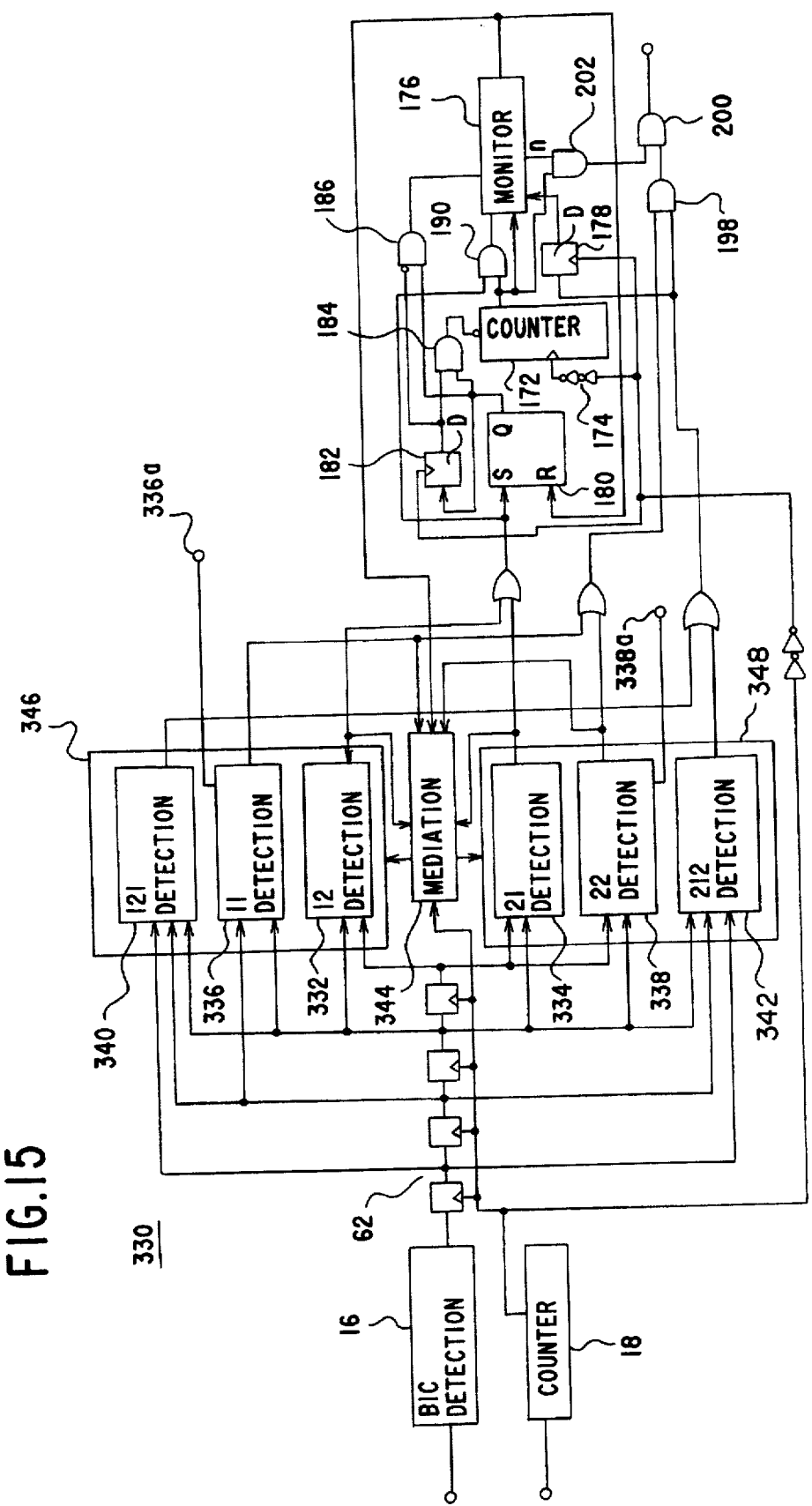
FIG. 15 is a circuit diagram showing one example of a frame changing point detection circuit of a case where the number of kinds of the BICs is two (2)

The detection of the frame changing point in such a case, a frame changing point detection circuit 330 as shown in FIG. 15, for example, can be implemented. The frame changing point detection circuit 330 is a circuit to which a method for detecting the frame changing point with utilizing the 334 pattern in the frame changing point 60 shown in FIG. 3 is applied.

Although the frame changing point detection circuit 330 operates in a similar manner of the operation of frame changing point detection circuit, basically, the counter 172 is constructed as a count of modulo 2, and respective BIC pattern detection circuits become to be corresponding to the patterns. That is, each of a BIC12 detection circuit 332 and a BIC21 detection circuit 334 operate in a manner similar to that of the operation of the BIC43 detection circuit. Furthermore, each of a BIC11 detection circuit 336 and a BIC22 detection circuit 338 operates in a manner similar to that of the operation of the BIC41/42 detection circuit 84, and each of a BIC121 detection circuit 340 and a BIC212 detection circuit 342 operates in a manner similar to that of the operation of the BIC111/222 detection circuit 117.

However, due to the limit of the number of kinds of the BICs, it is impossible to deviate an occurrence position of the sub-changing point of (BIC2-BIC1) for detecting (BIC2-BIC2) and an occurrence position of the sub-changing point of (BIC1-BIC2) for detecting (BIC1-BIC1) from each other, and therefore, it is required to make one of the detection circuits in a wait state during a time that the other of the detection circuits operates to detect the frame changing point. Therefore, in this embodiment shown, a mediation circuit 344 is inserted.

In addition, a detection circuit set 346 for detecting the frame changing point of (BIC1-BIC1) includes the BIC12 detection circuit 332, the BIC11 detection circuit 336 and the BIC121 detection circuit 340. Furthermore, in a detection circuit set for detecting the frame changing point of (BIC2-BIC2), the BIC21 detection circuit 334, the BIC22 detection circuit 338 and the BIC212 detection circuit 342 are included. Since other portions of this embodiment shown are approximately the same or similar to that of the frame changing point detection circuit 60 shown in FIG. 4, that is, the case of the four kinds of BICs, the same reference numerals are utilized, to omit a duplicate description. Furthermore, a basic operation of the frame changing point detection circuit 330 is also similar to the operation of the frame changing point detection circuit 60, and accordingly, in the following, a duplicate description of the operation will be omitted, and the mediation circuit 344 which is newly added will be mainly described.

In an initial state of the mediation circuit 344, the both detection circuit sets 344 and 348 are made in active state such that the BIC changing pattern is waited for being detected in one of the BIC 12 detection circuit 332 and the BIC21 detection circuit 334. In a case where the BIC21 detection circuit 334 detects the BIC changing pattern rapidly in comparison with the BIC12 detection circuit 332, a BIC21 detection signal is inputted to the mediation circuit 344. In order to detect the frame changing point of (BIC2-BIC2) thereafter, the mediation circuit 344 outputs a signal by which the detection circuit set 346 for detecting the frame changing point of (BIC1-BIC1) in a wait state to the set 346. The detection circuit set 346 thus made to be in a wait state always outputs a signal of a low level irrespective of an input until a time in which the set 346 is returned to its active state by the mediation circuit 344.

The mediation circuit 344 is reset at a time in which a signal applied from the BIC changing point monitor circuit 176 to an R terminal of the RS flip-flop 180 is changed from the high level to the low level. If the mediation circuit 344 is reset, the mediation circuit 344 makes the both of the detection circuit sets 346 and 348 in the active states, respectively. Furthermore, the mediation circuit 344 has a function by which the both of the detection circuit sets 346 and 348 are made to be in the wait state during one block after one block from a time that any one of the BIC11 detection circuit 336 and the BIC22 detection circuit 338 becomes the high level.

The circuit shown in FIG. 4 is connected to the frame changing point detection circuit 330. More specifically, an address 338a outputted from the BIC11 detection circuit 336 is inputted to the terminal 320b, and an address 338a outputted from the BIC22 detection circuit 338 is inputted to the terminal 322b.

Figure 16:
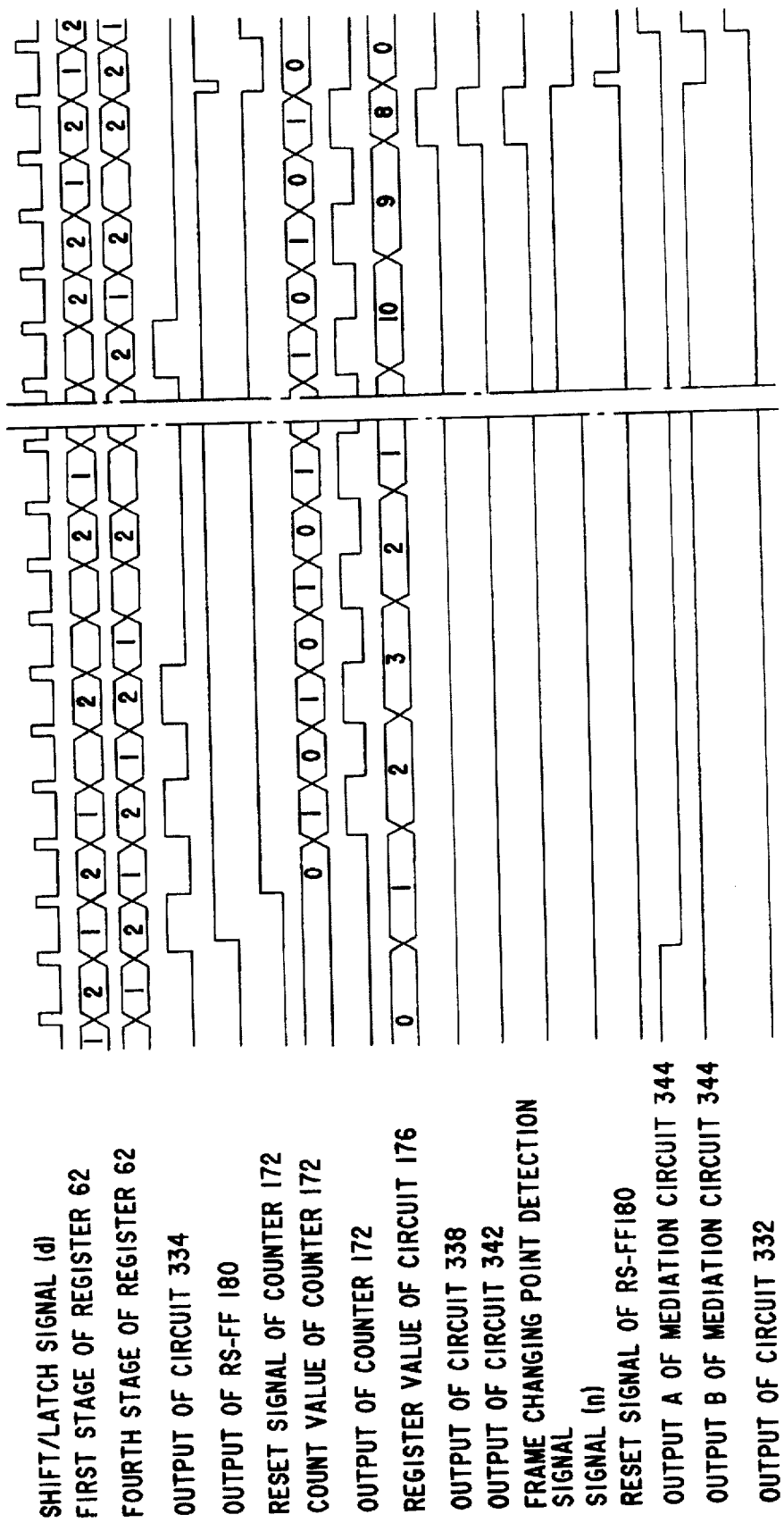
FIG. 16 is a timing chart showing one example of an operation of the frame changing point detection circuit shown in FIG. 15.

In addition, a timing chart in detecting the frame changing point of (BIC2-BIC2) with utilizing the frame changing point detection circuit 330 shown in FIG. 15 is shown in FIG. 16.

In FIG. 16, an output A of the mediation circuit 344 indicates a wait signal for the detection circuit set 346. The detection circuit set 346 is made to be in the wait state at a time that the wait signal is a low level. Furthermore, an output B from the mediation circuit 348 is utilized for making the detection circuit set 348 in the wait state. That is, if the wait signal is a low level, the detection circuit set 348 is made to be in the wait state. As seen from FIG. 16, the BIC changing pattern of (BIC2-BIC1) is to be detected in a block just after the BIC22 detection circuit 338 becomes a high level; however, the BIC21 detection circuit 334 is made to be in its wait state by the output B from the mediation circuit 344.

Figure 17:
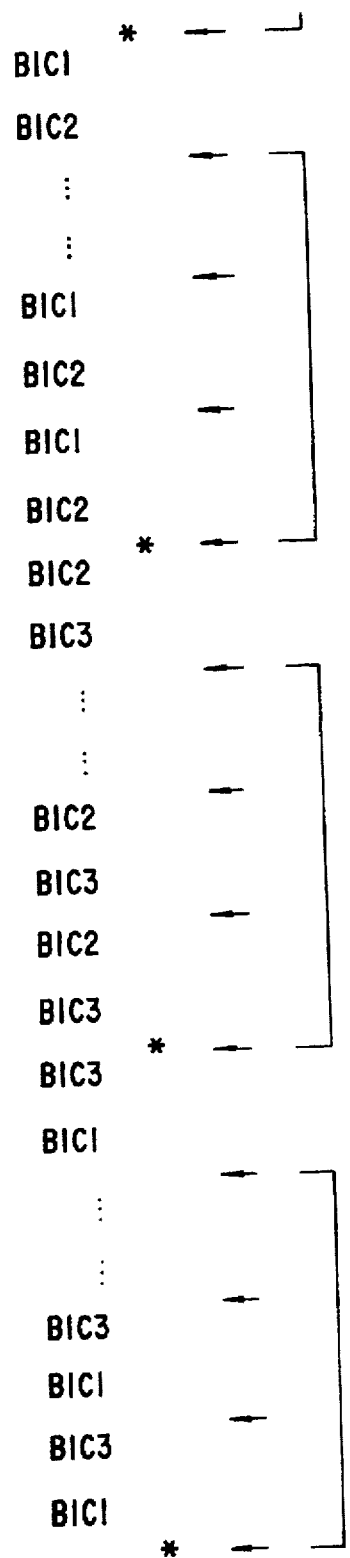
FIG. 17 is an illustrative view showing one example of a BIC arrangement of a case where the number of kinds of BICs is three (3)

Next, a case where the number of kinds of the BICs is three (3) will be described. One example of the BIC arrangement of such a case is shown in FIG. 17. In FIG. 17, as the BICs, the BIC1, BIC2 and BIC3 are utilized, and the frame changing points of (BIC2-BIC2) exists at an appearance scheduled position of a sub-changing point of (BIC2-BIC1), and the frame changing point of (BIC2-BIC2) exists at an appearance scheduled position of a sub-changing point of (BIC3-BIC2), and the frame changing point of (BIC1-BIC1) exists at an appearance scheduled position of a sub-changing point of (BIC1-BIC3).

Figure 18:
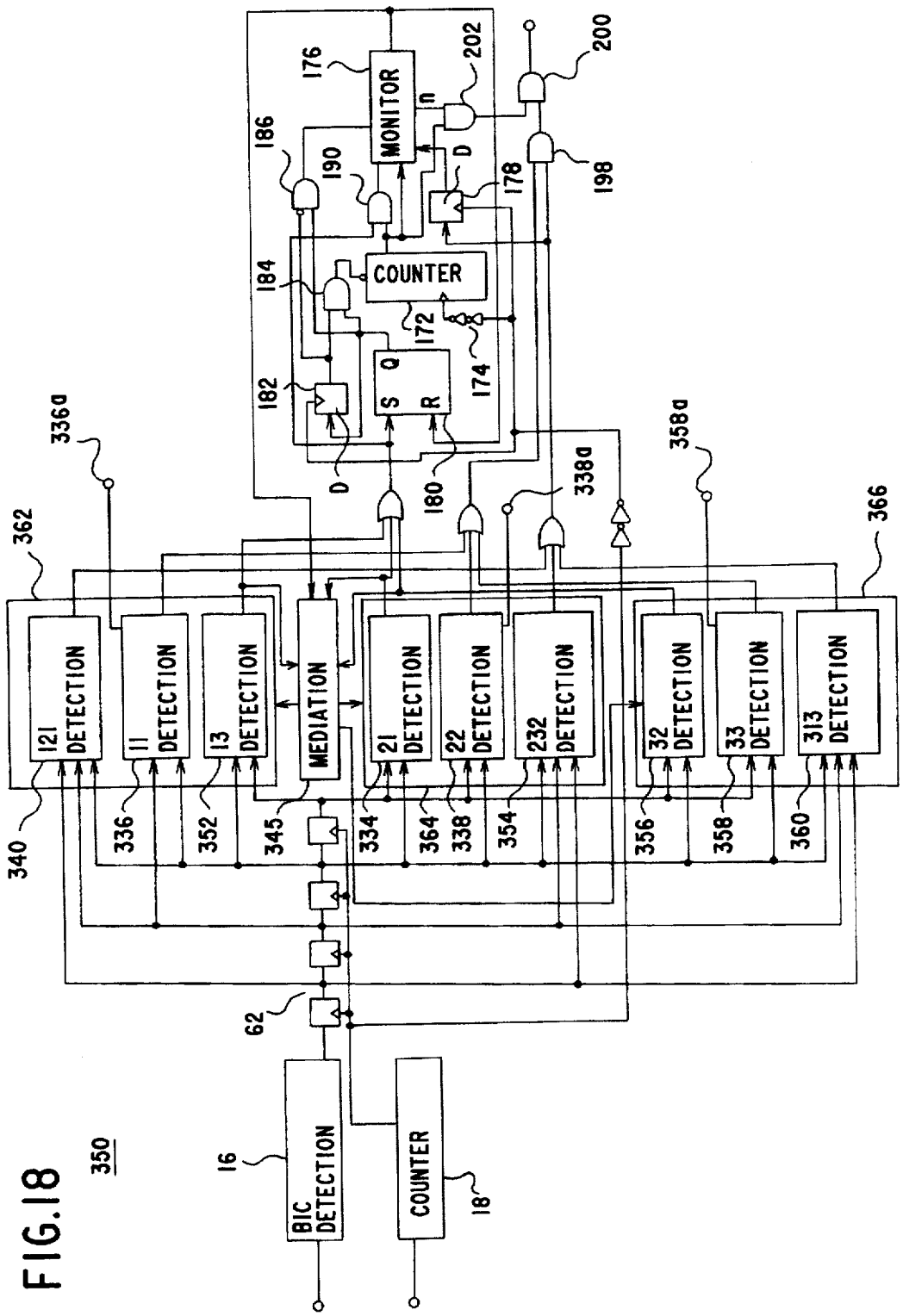
FIG. 18 is a circuit diagram showing one example of a frame changing point detection circuit of a case where the number of the kinds of the BIC is three (3)

In such a case, the detection of the frame changing point is implemented by a frame changing point detection circuit 350 shown in FIG. 18, for example. The frame changing point detection circuit 350 is similar to the frame changing point detection circuit 330 shown in FIG. 15, to which a method for detecting the frame changing point with utilizing the BIC changing pattern of (BIC1-BIC2) and the BIC changing pattern of (BIC2-BIC1) is applied.

The frame changing point detection circuit 350 includes the BIC11 detection circuit 336, the BIC22 detection circuit 338 and the BIC121 detection circuit 340, and further a BIC13 detection circuit 352, a BIC232 detection circuit 354, a BIC32 detection circuit 356, a BIC33 detection circuit 358 and a BIC313 detection circuit 360. Other portions of the frame changing point detection circuit 350 are approximately the same or similar to corresponding portions of the frame changing point detection circuit 330, and therefore, by utilizing the same reference numerals, a duplicate description will be omitted here.

The frame changing point detection circuit 350 operates in a manner similar to the operation of the frame changing point detection circuit 60 basically; however, respective BIC patterns become to be corresponding to respective patterns. That is, each of the BIC13 detection circuit 352, the BIC21 detection circuit 334 and the BIC32 detection circuit 356 operates as similar to the BIC43 detection circuit 64, and each of the BIC11 detection circuit 336, the BIC22 detection circuit 338 and the BIC33 detection circuit 358 operates as similar to the BIC41/42 detection circuit 84, and each of the BIC121 detection circuit 340, the BIC232 detection circuit 354 and the BIC333 detection circuit 360 operates in a manner similar to the BIC111/222 detection circuit 117.

Because of the same reason as that of a case where the number of kinds of the BICs is two (2), it is necessary to provide a mediation circuit 345. In addition, the mediation circuit 345 makes three detection circuit sets 362, 364 and 366 in wait states. The detection circuit set 362 for detecting the frame changing point of (BIC1-BIC1) includes the BIC13 detection circuit 352, the BIC11 detection circuit 336 and the BIC121 detection circuit 340. The detection circuit set 364 for detecting the frame changing point of (BIC2-BIC2) includes the BIC21 detection circuit 334, the BIC22 detection circuit 338 and the BIC232 detection circuit 354. In the detection circuit set 366 for detecting the frame changing point of (BIC3-BIC3), the BIC32 detection circuit 356, the BIC33 detection circuit 358 and the BIC313 detection circuit 360 are included.

A basic operation of this embodiment shown is similar to the operation of FIG. 15 embodiment, and therefore, a duplicate description will be omitted here, and the mediation circuit 345 which is slightly changed from the mediation circuit 344 will be described mainly.

In an initial state of the mediation circuit 345, the three detection circuit sets 362, 364 and 366 are made to be in the active states to wait the BIC changing pattern is detected in any one of the BIC13 detection circuit 352, the BIC21 detection circuit 334 and the BIC32 detection circuit 356. If the BIC21 detection circuit 334 first detects the BIC changing pattern, the BIC21 detection signal is inputted to the mediation circuit 345, and in order to detect the frame changing point of (BIC2-BIC2) thereafter, the mediation circuit 345 outputs a signal by which the detection circuit set 362 for detecting the frame changing point of (BIC1-BIC1) and the detection circuit set 366 for detecting the frame changing point of (BIC3-BIC3) are made to be in the wait states to the detection circuit sets 362 and 366. Accordingly, the detection circuit sets thus made to be in the wait states always output signals of low levels irrespective of inputs until a time that the same are returned to the active states by the mediation circuit 345. The mediation circuit 345 is reset at a timing that a signal applied to the R terminal of the RS flip-flop 180 from the BIC changing point monitor circuit 176 is changed to the low level from the high level. Furthermore, when the mediation circuit 345 is reset, the mediation circuit 345 makes all the detection circuit sets 362, 364 and 366 in the active states.

In such a case, the circuit shown in FIG. 4 is connected to the frame changing point detection circuit 350. More specifically, an address 336a outputted from the BIC11 detection circuit 336 is applied to the terminal 320b, and an address 338a outputted from the BIC22 detection circuit 338 is applied to the terminal 322b, and an address 358a outputted from the BIC33 detection circuit 358 is applied to the terminal 320b and a terminal (not shown) connected to the selector 34 as similar to the terminal 322b.

Figure 19:
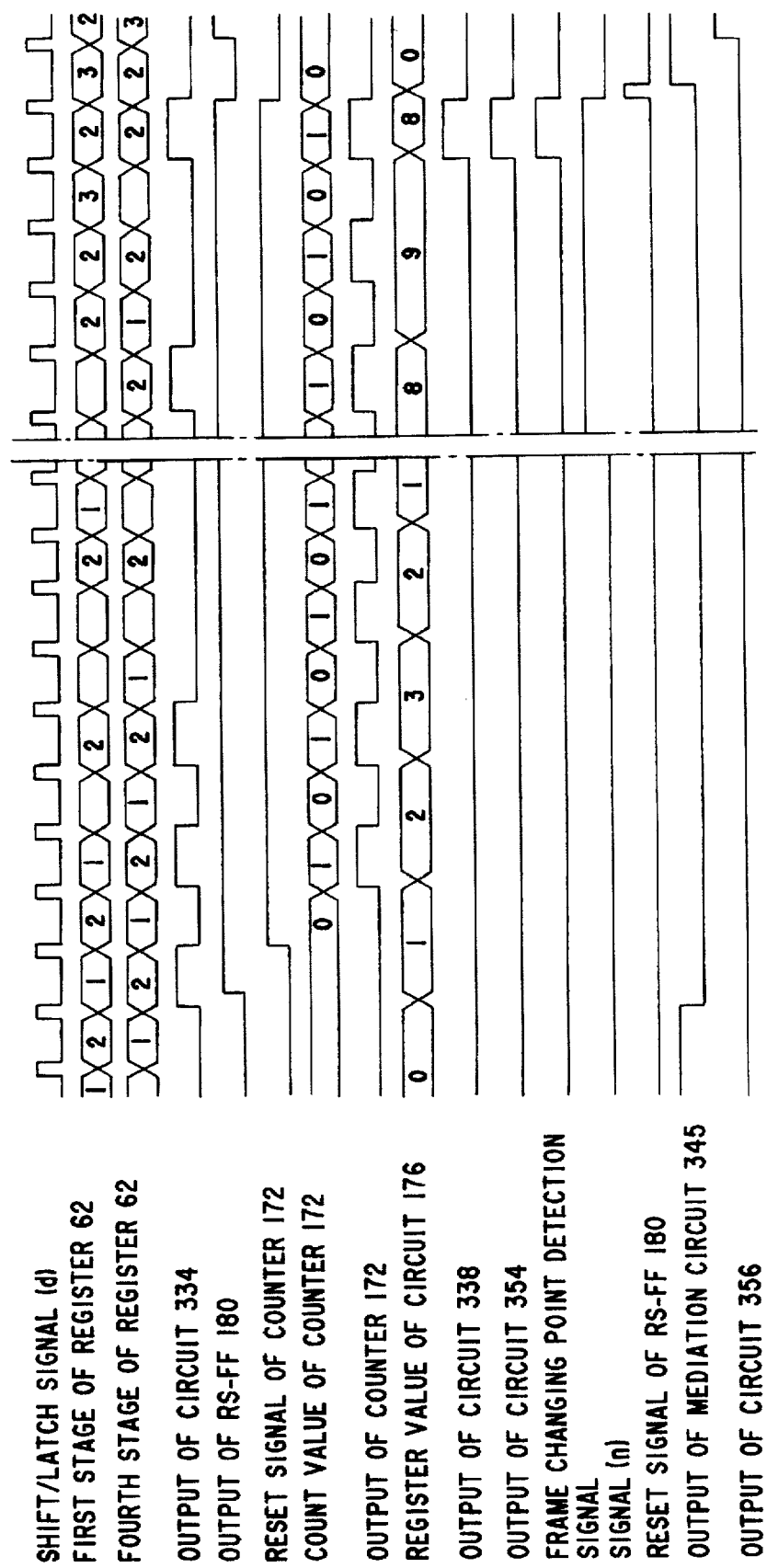
FIG. 19 is a timing chart showing one example of an operation of the frame changing point detection circuit shown in FIG. 18.

A timing chart in detecting the frame changing point of (BIC2-BIC2) with utilizing the frame changing point detection circuit 350 is shown in FIG. 19.

In FIG. 19, an output of the mediation circuit 345 indicates the wait signal for the detection circuit sets 362 and 366. In addition, if the wait signal is the low level, the detection circuit sets 362 and 366 are made to be in the wait states.

Furthermore, according to the above described embodiment, by utilizing the frame-synchronous reproducing circuit together, a packet correctly-receiving-rate is necessarily increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frame-synchronous reproducing circuit for an FM multiplex broadcasting receiver which receives data in which a single frame is constructed by a plurality of blocks having identification codes for frame synchronization, comprising:

a pattern detection means for detecting an identification code changing pattern of a plurality of blocks including a frame changing point by which a position within the frame can be established; and a frame synchronization establishment means for establishing the frame synchronization of said data on the basis of a detection result by said pattern detection means, wherein said identification codes include first, second, third and fourth identification codes, and said frame changing point includes a frame changing point of the fourth identification code to the first identification code, a frame changing point of the fourth identification code to the second identification code, a frame changing point of the first identification code to the third identification code, and a frame changing point of the second identification code to the third identification code, and wherein said pattern detection means sets the number of the blocks in a manner in which, with respect to the frame changing point of the fourth identification code to the first identification code or the fourth identification code to the second identification code, the number of the blocks before the frame changing point is greater than the number of the blocks after said frame changing point.

2. A frame-synchronous reproducing circuit according to claim 1, wherein said pattern detection means sets the number of the blocks in a manner such that, with respect to the frame changing point of the first identification code to the third identification code or the second identification code to the third identification code, the number of the blocks before said frame changing point is less than the number of the blocks after said frame changing point.

3. A frame-synchronous reproducing circuit for an FM multiplex broadcasting receiver which receives data in which a single frame is constructed by a plurality of blocks having identification codes for frame synchronization, comprising:

a monitor means for monitoring an appearance of a first identification code changing pattern not including a frame changing point by which a position within the frame can be established; and a pattern detection means for detecting a second identification code changing pattern including the frame changing point, said frame changing point included in said second identification code changing pattern being regarded as a true frame changing point at a time in which said pattern detection means detects said second identification code changing pattern and said second identification code changing pattern is detected in a manner depending on a detected position of said first identification code changing pattern detected by said monitor means.

4. A frame-synchronous reproducing circuit according to claim 3, wherein said identification codes includes first, second, third and fourth identification codes, and said frame changing point includes a frame changing point of the fourth identification code to the first identification code, a frame changing point of the fourth identification code to the second identification code, a frame changing point of the first identification code to the third identification code, and a frame changing point of the second identification code to the third identification code.

5. A frame-synchronous reproducing circuit according to claim 4, wherein said first identification code changing pattern which is detected by said monitor means includes a changing pattern of the fourth identification code to the third identification code, and said second identification code changing pattern which is detected by said pattern detection means includes the fourth identification code to the first identification code.

6. A frame-synchronous reproducing circuit according to claim 5, wherein said monitor means monitors the appearance of said first identification code changing pattern by incrementing a count value when said first identification code changing pattern is detected by a timing that said first identification code changing pattern is to be originally detected, and by decrementing the count value when no first identification code changing pattern is detected at a timing said first identification code changing pattern is to be originally detected.

7. A frame-synchronous reproducing circuit according to claim 4, wherein said first identification code changing pattern which is detected by said monitor means includes a changing pattern of the fourth identification code to the third identification code, and said second identification code changing pattern which is detected by said pattern detection means includes the fourth identification code to the second identification code.

8. A frame-synchronous reproducing circuit according to claim 5 or 7 wherein said pattern detection means detects said second identification code changing pattern at a timing in which said monitor means detects said first identification code changing pattern.

9. A frame-synchronous reproducing circuit according to claim 7, wherein said monitor means monitors the appearance of said first identification code changing pattern by incrementing a count value when said first identification code changing pattern is detected by a timing that said first identification code changing pattern is to be originally detected, and by decrementing the count value when no first identification code changing pattern is detected at a timing said first identification code changing pattern is to be originally detected.

10. A frame-synchronous reproducing circuit according to claim 4, wherein said first identification code changing pattern which is detected by said monitor means includes a changing pattern of the first identification code to the first identification code, and said second identification code changing pattern which is detected by said pattern detection means includes the first identification code to the third identification code to the third identification code to the fourth identification code.

11. A frame-synchronous reproducing circuit according to claim 4, wherein said first identification code changing pattern which is detected by said monitor means includes a changing pattern of the second identification code to the second identification code, and said second identification code changing pattern which is detected by said pattern detection means includes the second identification code to the third identification code to the third identification code to the fourth identification code.

12. A frame-synchronous reproducing circuit according to claim 4, wherein said monitor means monitors the appearance of said first identification code changing pattern by incrementing a count value when said first identification code changing pattern is detected by a timing that said first identification code changing pattern is to be originally detected, and by decrementing the count value when no first identification code changing pattern is detected at a timing said first identification code changing pattern is to be originally detected.

13. A frame-synchronous reproducing circuit according to claim 3, wherein said monitor means monitors the appearance of said first identification code changing pattern by incrementing a count value when said first identification code changing pattern is detected by a timing that said first identification code changing pattern is to be originally detected, and by decrementing the count value when no first identification code changing pattern is detected at a timing said first identification code changing pattern is to be originally detected.

14. A frame-synchronous reproducing circuit according to any one of claims 1–4, 7, 10 or 11, wherein said monitor means monitors the appearance of said first identification code changing pattern by incrementing a count value when said first identification code changing pattern is detected at a timing in which said first identification code changing pattern is to be originally detected, and by decrementing the count value when no first identification code changing pattern is detected at a timing in which said first identification code changing pattern is to be originally detected.

15. A frame-synchronous reproducing circuit for an FM subcarrier data receiver which receives data in which a frame is constructed by a plurality of blocks having identification codes for frame synchronization, a first specific identification code changing pattern out of a plurality of identification code changing patterns being a frame changing point by which a position within the frame can be decided, a second specific identification code changing pattern which is arranged before said frame changing point and can not decide a position within the frame being a sub-changing point, said identification codes being arranged in a manner in which said frame changing point appears at a timing in which said sub-changing point appears, said circuit comprising:

a monitor means for monitoring the appearance of said sub-changing point; and a frame changing point detection means for detecting said frame changing point, said frame changing point being regarded as a true frame changing point at a time in which said frame changing point detection means detects said frame changing point and said monitor means detects said sub-changing point more than a predetermined number of times before said frame changing point detection means detects said frame changing point.

* * * * *